(12) United States Patent
Crampton

(10) Patent No.: US 7,954,250 B2
(45) Date of Patent: Jun. 7, 2011

(54) CMM ARM WITH ENHANCED MANUAL CONTROL

(75) Inventor: Stephen James Crampton, London (GB)

(73) Assignee: Nikon Metrology N.V., Heverlee (BE)

( * ) Notice: Subject to any disclaimer, the term of this patent is extended or adjusted under 35 U.S.C. 154(b) by 350 days.

(21) Appl. No.: 11/989,558

(22) PCT Filed: Aug. 7, 2006

(86) PCT No.: PCT/EP2006/007810
§ 371 (c)(1),
(2), (4) Date: Jan. 28, 2008

(87) PCT Pub. No.: WO2007/017235
PCT Pub. Date: Feb. 15, 2007

(65) Prior Publication Data
US 2009/0000136 A1 Jan. 1, 2009

(30) Foreign Application Priority Data

Aug. 8, 2005 (GB) .................................. 0516276.3
Sep. 13, 2005 (GB) .................................. 0518653.1

(51) Int. Cl.
*G01B 5/008* (2006.01)
*G05B 11/01* (2006.01)
(52) U.S. Cl. .......................................... 33/503; 33/559
(58) Field of Classification Search .................. 33/503, 33/559, 1 M
See application file for complete search history.

(56) References Cited

U.S. PATENT DOCUMENTS

| | | | |
|---|---|---|---|
| 4,985,668 A | 1/1991 | Akira et al. | |
| 5,418,440 A | 5/1995 | Yoshifumi et al. | |
| 5,694,013 A * | 12/1997 | Stewart et al. | 318/561 |
| 6,088,020 A * | 7/2000 | Mor | 345/156 |
| 6,125,337 A * | 9/2000 | Rosenberg et al. | 702/153 |
| 6,281,651 B1 * | 8/2001 | Haanpaa et al. | 318/568.11 |
| 6,366,273 B1 * | 4/2002 | Rosenberg et al. | 345/156 |
| 6,408,224 B1 | 6/2002 | Okamoto et al. | |
| 7,395,606 B2 * | 7/2008 | Crampton | 33/503 |
| 7,591,078 B2 * | 9/2009 | Crampton | 33/503 |
| 7,797,849 B2 * | 9/2010 | Gomez et al. | 33/503 |
| 2002/0087233 A1 * | 7/2002 | Raab | 700/262 |
| 2003/0167647 A1 * | 9/2003 | Raab et al. | 33/503 |
| 2005/0166413 A1 * | 8/2005 | Crampton | 33/503 |
| 2008/0235970 A1 * | 10/2008 | Crampton | 33/503 |
| 2008/0289204 A1 * | 11/2008 | Crampton | 33/503 |
| 2009/0106994 A1 * | 4/2009 | Gomez et al. | 33/503 |

FOREIGN PATENT DOCUMENTS

| | | |
|---|---|---|
| EP | 0 092 378 A | 10/1983 |
| EP | 1 498 797 A | 1/2005 |
| WO | WO 2004/096502 A | 11/2004 |

OTHER PUBLICATIONS

Grange, et al., "The Delta Haptic Device." Internet Citation, Jul. 2001, pp. 1-6.
Frisoli, et al., "Design of a New Tendon Driven Haptic Interface with Six Degrees of Freedom." International Workshop on Robot and Human Interaction, Sep. 1999, pp. 303-308.
Chen, et al., "On the Development of a Haptic System for Rapid Product Development." Computer Aided Design, 17 (2005) pp. 559-569.
The International Search Report for PCT Application No. PCT/EP006/007810, dated Jan. 29, 2008.
The Written Opinion of the International Searching Authority for PCT Application No. PCT/EP2006/007810, dated Jan. 29, 2008.

* cited by examiner

*Primary Examiner* — Yaritza Guadalupe-McCall
(74) *Attorney, Agent, or Firm* — Amster, Rothstein & Ebenstein LLP

(57) ABSTRACT

The present invention relates to an apparatus for a Robust CMM Arm with Exoskeleton is provided comprising an Internal CMM Arm and an Exoskeleton driving the Internal CMM Arm through a plurality of transmission means such that one or more internal volumes are sealed against ingress of solid objects and fluids. It also relates to a haptic control of an RCA.

16 Claims, 14 Drawing Sheets

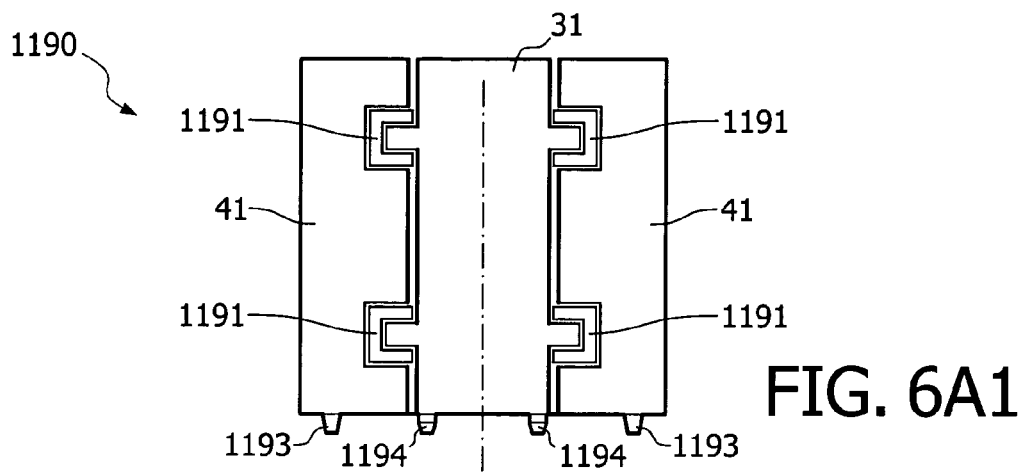
FIG. 6A1
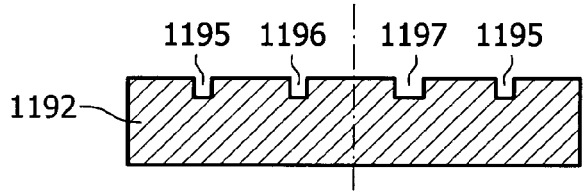
FIG. 6A2
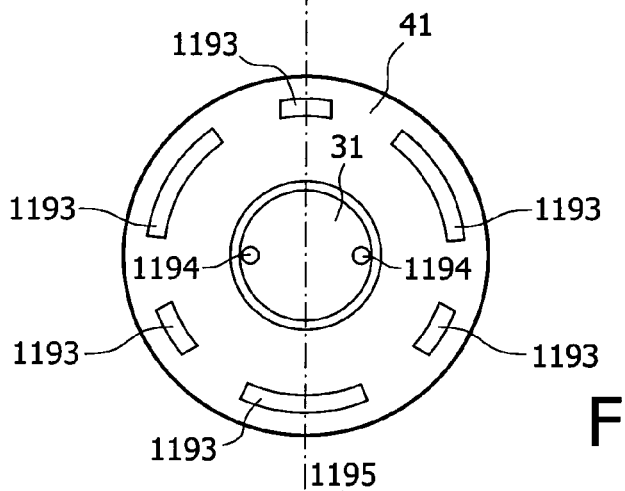
FIG. 6A3
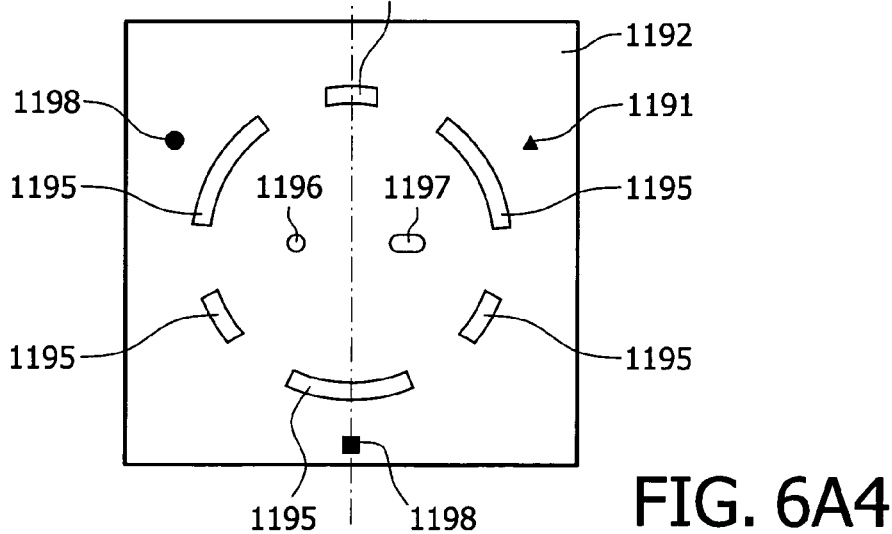
FIG. 6A4

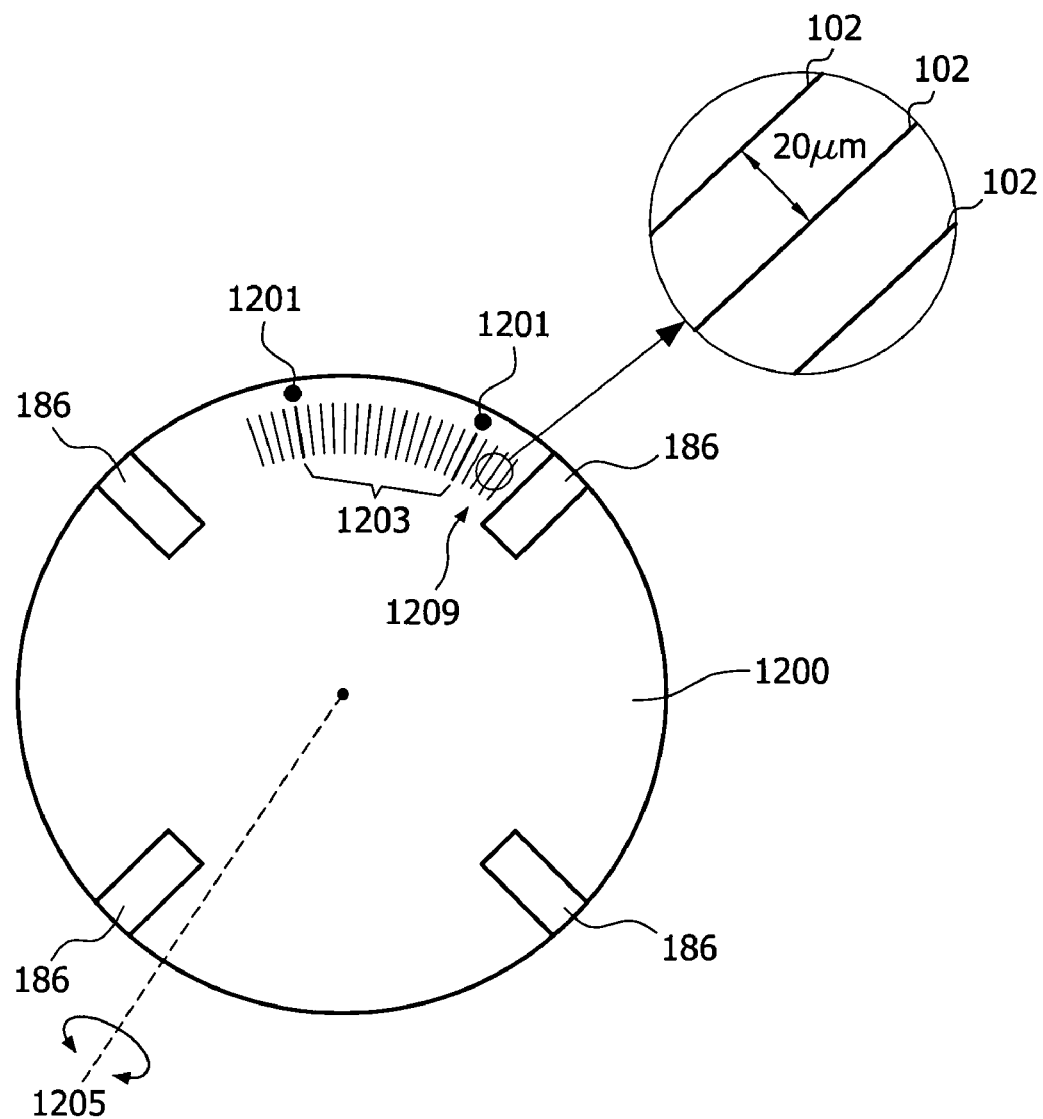
FIG. 6B1

1204
27,65,27,63,27,61,27,59,27,57,27,55,27,53,27,51,27,49,27,47,27,45,27,43,27,
41,27,39,27,37,27,35,27,33,27,31,27,29,29,65,29,63,29,61,29,59,29,57,29,55,
29,53,29,51,29,49,29,47,29,45,29,43,29,41,29,39,29,37,29,35,29,33,29,31,31,
65,31,63,31,61,31,59,31,57,31,55,31,53,31,51,31,49,31,47,31,45,31,43,31,41,
31,39,31,37,31,35,31,33,33,65,33,63,33,61,33,59,33,57,33,55,33,53,33,51,33,
49,33,47,33,45,33,43,33,41,33,39,33,37,33,35,35,65,35,63,35,61,35,59,35,57,
35,55,35,53,35,51,35,49,35,47,35,45,35,43,35,41,35,39,35,37,37,65,37,63,37,
61,37,59,37,57,37,55,37,53,37,51,37,49,37,47,37,45,37,43,37,41,37,39,39,65,
39,63,39,61,39,59,39,57,39,55,39,53,39,51,39,49,39,47,39,45,39,43,39,41,41,
65,41,63,41,61,41,59,41,57,41,55,41,53,41,51,41,49,41,47,41,45,41,43,43,65,
43,63,43,61,43,59,43,57,43,55,43,53,43,51,43,49,43,47,43,45,45,65,45,63,45,
61,45,59,45,57,45,55,45,53,45,51,45,49,45,47,47,65,47,63,47,61,47,59,47,57,
47,55,47,53,47,51,47,49,49,65,49,63,49,61,49,59,49,57,49,55,49,53,49,51,51,
65,51,63,51,61,51,59,51,57,51,55,51,53,53,65,53,63,53,61,53,59,53,57,53,55,
55,65,55,63,55,61,55,59,55,57,57,67
1203
FIG. 6B2

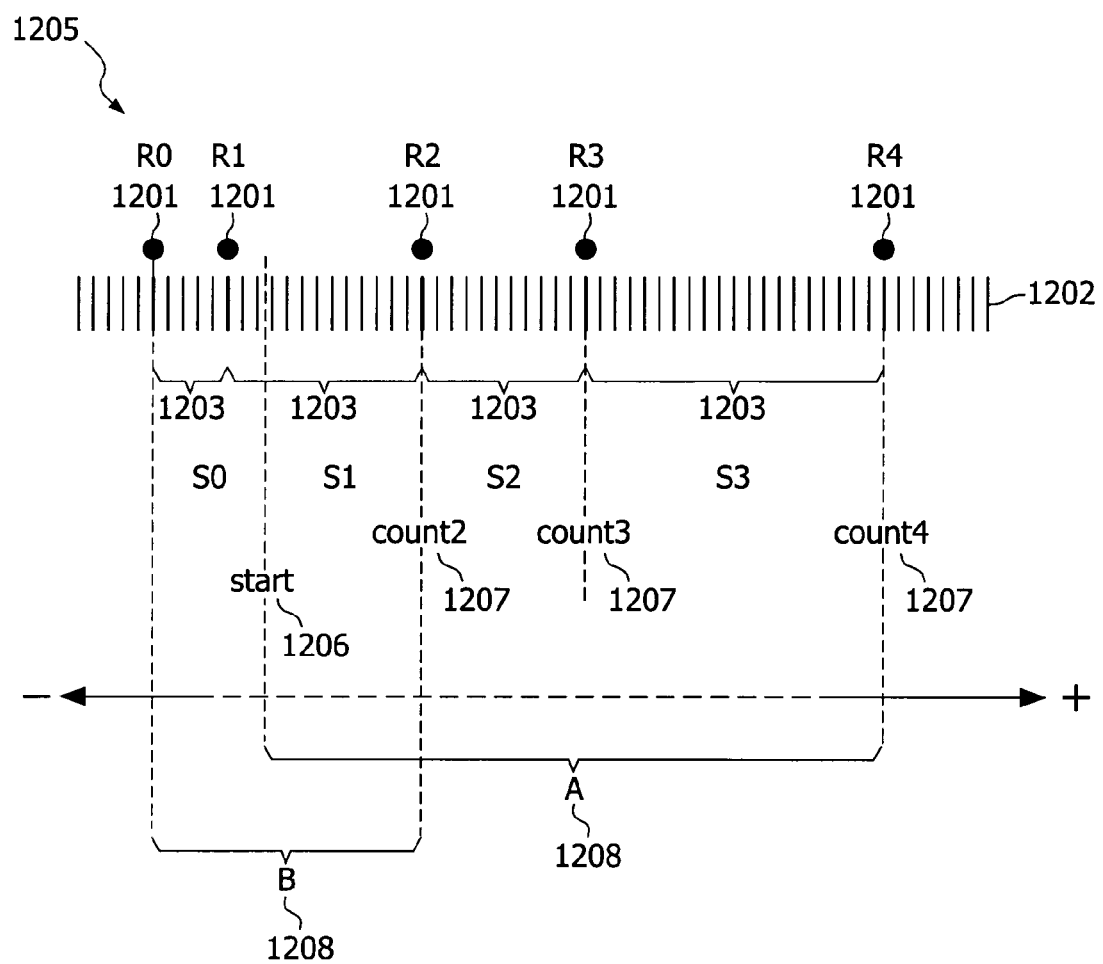
FIG. 6B3

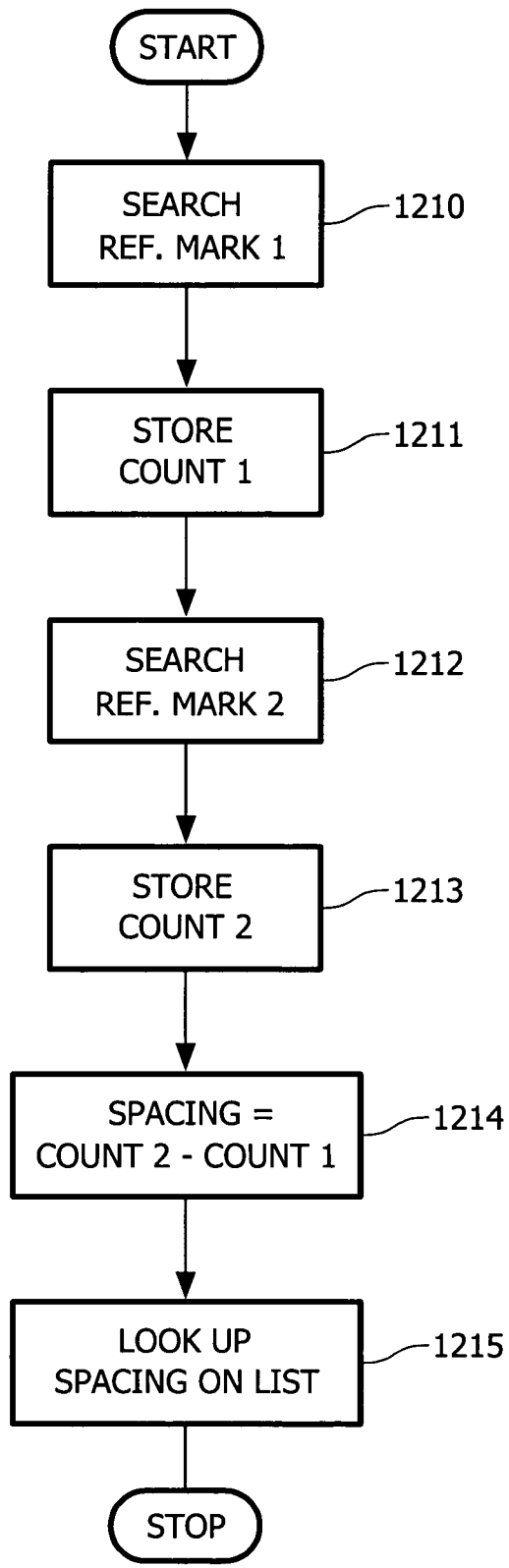
FIG. 6B4

CMM ARM WITH ENHANCED MANUAL CONTROL

This is a U.S. national phase of PCT Application No. PCT/EP2006/007810, filed Aug. 7, 2006, and claims priority to GB Application No. 0516276.3, filed Aug. 8, 2005, and GB Application No. 0518653.1, filed Sep. 13, 2005.

FIELD OF THE INVENTION

The present invention concerns apparatus and method for a CMM Arm with an enhanced manual control for performing accurate measurement and operations in demanding environments and for manual manipulation. It also concerns apparatus and method for a CMM Arm with an exoskeleton.

BACKGROUND TO THE INVENTION

A Co-ordinate Measuring Machine (CMM) Arm is an articulated measuring apparatus comprising two or more links connected by intervening joints. It serves as a movable position reporting device which monitors the internal angles adopted by said links so that the position and orientation of a probe end can be calculated with some accuracy, typically below 0.1 mm. A CMM arm usually comprises the probe end to support a measuring device such as a non-contact probe. A CMM Arm is well known in the art. It is mainly used in metrology applications. A CMM Arm is a manual apparatus; this means that a human operator must manually move and sometimes support the arm in the desired position to take measurements. Manufacturers of such arms are, for example, Faro or Cimcore.

A robot is also an apparatus that is articulated, comprising two or more links and joints and a probe end for supporting tools and/or measurement devices. It serves as a movable member. However, unlike the CMM Arm, the robot links can be moved by a powered means e.g. servo or hydraulic mechanisms. Although it possesses the capability of giving some position and orientation information about the probe end, its accuracy is not as good as that of a CMM Arm. Therefore, robots are not used for high precision metrology applications. Manufacturers of robots are, for example Kuka or Fanuc.

A Robot CMM Arm (RCA) combines the powered movement of a robot with the accuracy of CMM Arm. An RCA thus comprises a movable member i.e. a robot; a movable position reporting device i.e. CMM Arm; and a transmission means in contact with both said movable member and said movable position reporting device. The elements are configured so the movements of the robot are transmitted to the CMM Arm via the transmission means. In practice, the robot of the RCA replaces the hands of the human operator, enabling the weight of CMM Arm to be taken by the movement mechanisms, and allowing semi- or automated movement of the probe end. High precision metrology applications are, therefore, possible in an automated way with an RCA.

RCA with Manual Control

The control of an RCA is by use of buttons provided on the arm. It requires much training and skill to operate in order to guide the probe to the desired position that is close enough to take a reading without colliding with the object being scanned. It is necessary that the acceleration and speed of the robot is slow under manual control, which slows down measurements. Furthermore, system of precautionary collision sensors and buffers becomes essential which add to the expense and weight of the RCA. The present invention overcomes the problem of controlling the RCA such that more accurate measurements are taken while reducing the risk of collision.

Robust RCA with Exoskeleton

An example of an RCA includes the RCA with Exoskeleton as disclosed in PCT/GB2004/001827 by Crampton the inventor of this present invention, which application is incorporated herein by reference. A Probe End Module for Articulated Arms is disclosed by Crampton in GB0424729.2. An RCA with Exoskeleton comprises an Internal CMM Arm 5 and an Exoskeleton 6 as depicted in the Figures of PCT/GB2004/001827 (e.g. FIG. 1C). On a production line, equipment lifetime operating cycles in excess of ten million cycles are not uncommon with Mean Time Between Failures of greater than 10,000 hours being expected. Line equipment ingress protection ratings against liquids and solid bodies of IP54 or greater are often demanded. For an RCA with Exoskeleton to be robust, all mechanical, electrical and software systems must have a concept and design to achieve these requirements. Our experience in overcoming the challenges of developing an RCA with Exoskeleton for demanding environments has led to the present invention.

SUMMARY OF THE INVENTION

One embodiment of the present invention is a Robot Co-ordinate Measuring Machine Arm, RCA, (1, 17, 1100) comprising a Robot (14), Co-ordinate Measuring Machine, CMM, Arm (2) and transmission means (9), configured to translate and/or rotate a probe end (12, 1000) in a haptic mode.

Another embodiment of the present invention is an RCA as described above, further comprising a sensing handle (1170) to receive the operator's manual pressure for haptic control.

Another embodiment of the present invention is an RCA as described above, wherein said sensing handle (1170) is mounted on the Robot Arm (14) after the final joint (13).

Another embodiment of the present invention is an RCA as described above, wherein the sensing handle comprises a stem (1171), a grip (1172) with three compliant transfers (1183) between the stem (1171) and grip (1172) such that the grip (1172) is free to move in six degrees of freedom in a compliant manner relative to the stem.

Another embodiment of the present invention is an RCA as described above, wherein an X length sensor (1174) and a Y length sensor (1175) are embedded in the Upper Compliant transfer (1173) and in a Lower Compliant transfer (1173) and a Z shear sensor (1176) and a Twist shear sensor (1177) are embedded in a Mid Compliant transfer (1173).

Another embodiment of the present invention is an RCA as described above, further comprising two opposing buttons (1178) at or towards the elbow, configured to rotate an elbow of the arm in a clockwise or anti-clockwise direction.

Another embodiment of the present invention is an RCA as described above, further comprising a contact probe, configured to decelerate the RCA when contact or force is applied to said probe.

Another embodiment of the present invention is an RCA as described above, further comprising a contact probe, configured to automatically perform one or more measurements when contact or force is applied to said probe.

Another embodiment of the present invention is an RCA as described above, further comprising a contact force scanning probe, which RCA is configured to maintain near ideal contact and orientation between said scanning probe and the object being scanned, while the operator provides a general direction to move the RCA by manually guiding the arm.

Another embodiment of the present invention is an RCA as described above, further comprising a response means to adapt the response of the RCA to the liking of the operator.

Another embodiment of the present invention is an RCA as described above, wherein said response means adapts the response of the RCA to appear light and responsive to the operator's hands manipulating the Arm.

Another embodiment of the present invention is an RCA as described above, wherein said response means adapts the response of the RCA to appear to have high inertia and low accelerations to the operator's hands manipulating the Arm.

Another embodiment of the present invention is an RCA comprising:
- a movable member;
- a movable position reporting device;
- transmission means in contact with both said movable member and said movable position reporting device;
- sealed from harmful ingress of fluids and solid objects.

Another embodiment of the present invention is an RCA as described above, wherein said movable member further comprises a plurality of linked sealed volumes and said movable position reporting device further comprises a plurality of linked sealed volumes such that fluids and small particles may pass between said movable member and said position reporting device.

Another embodiment of the present invention is an RCA as described above, wherein each sealed volume is sealed to at least a minimum ingress protection rating.

Another embodiment of the present invention is an RCA as described above, further comprising entrance gap restriction means (1124) wherein ingress between said movable member and said movable position reporting device of foreign bodies sizable enough to do damage is prevented by said entrance gap restriction means.

Another embodiment of the present invention is an RCA as described above, wherein the maximum size of foreign body permitted entry between said movable member and said movable position reporting device is smaller than the minimum gap between said movable member and said movable position reporting device as said movable member and said movable position reporting device move relative to each other.

Another embodiment of the present invention is an RCA as described above, further comprising at least one motor pod means.

Another embodiment of the present invention is an RCA as described above, further comprising an internal Ethernet system, an external Ethernet system and a gateway between said internal Ethernet system and said external Ethernet system.

Another embodiment of the present invention is an RCA as described above, further comprising an outer position control loop and an inner velocity control loop.

Another embodiment of the present invention is an RCA as described above, further comprising encoders on said movable member, encoders on said movable position reporting device and a controller characterised by high gain input from said encoders on said movable position reporting device into said controller's position control loop and high gain input from said encoders on said movable member into said controller's velocity and acceleration control loops.

Another embodiment of the present invention is an RCA as described above, wherein said movable position reporting device further comprises at least one bearing pair wherein said at least one bearing pair is calibrated to produce calibration data and said calibration data is used to increase the measurement accuracy.

Another embodiment of the present invention is an RCA as described above, wherein said movable position reporting device further comprises at least one bearing pair wherein said at least one bearing pair is calibrated to produce calibration data and said calibration data is used to increase the accuracy of path following.

Another embodiment of the present invention is an RCA as described above, wherein said movable position reporting device further comprises at least one bearing pair and a plurality of displacement sensors arranged to measure the runout of each bearing.

Another embodiment of the present invention is an RCA as described above, connected by tele-operation means to a second apparatus, which second apparatus may be a manual or non-manual RCA.

Another embodiment of the present invention is an RCA as described above, further comprising a base assembly that:
- permits limited relative movement between the base of said movable member and the base of said movable position reporting device;
- is easy to locate manually;
- is robust;
- has high repeatability of alignment of said movable position reporting device.

Another embodiment of the present invention is an RCA as described above, further comprising joint referencing means comprising a large number of reference marks on a grating with variable spacing between said reference marks.

Another embodiment of the present invention is an RCA as described above, wherein said RCA is as described above.

Another embodiment of the present invention is an RCA as described above, wherein said RCA comprises a robot exoskeleton.

Another embodiment of the present invention is a method for referencing a joint comprising the following steps:
- locating a plurality of reference marks;
- subtracting the locations of each of said reference marks with respect to the location of its neighbouring reference mark to determine the one or more spacings between said reference marks;
- looking up said one or more spacings in a list to reference said joint.

Another embodiment of the present invention is a system for controlling an RCA comprising an outer control loop, and an inner control loop for each axis, whereby
- the outer control loop receives angular position feedback from a rotary encoder on an RCA joint,
- the outer control loop provides demand velocities to the inner control loop for each axis
- the inner control loop receives demand velocities from the outer control loop and from a motor encoder,
- the inner control loop provides control signals to drive a motor.

In the prior art, an RCA with Exoskeleton has been disclosed by Crampton. Environments such as production and assembly lines in which an RCA with Exoskeleton is needed, provide high demands for robustness and ingress protection on an RCA with Exoskeleton.

Accordingly, it is an objective of the first embodiment of the present invention to provide an RCA with Exoskeleton that has novel and robust sealing. It is a further object of the present invention to provide a more robust ethernet-based architecture. It is a further object of the present invention to provide a more robust control system. It is a further object of the present invention to provide a more robust apparatus for bearing calibration. It is a further object of the present invention to provide an improved apparatus for compensation. It is a further object of the present invention to provide an improved base assembly. It is a further object of the present invention to provide improved referencing. It is a further object of the present invention to provide improved thermal stability. In a second embodiment of the present invention, an apparatus and method for manual operation in a haptic mode are provided. In a third embodiment of the present invention, an apparatus and method for tele-operation are provided.

BRIEF DESCRIPTION OF THE DRAWINGS

Embodiments of the present invention will now be described, by way of example only, with reference to the accompanying drawings, in which:

FIG. 6A1 is a section of a base assembly in cross-section;

FIG. 6A2 is a section of a plate in cross-section;

FIG. 6A3 is a schematic of the base of a base assembly in cross-section;

FIG. 6A4 is a schematic of a plate in plan view;

FIG. 6B1 is a schematic of a grating with multiple reference marks in plan view;

FIG. 6B2 is a list of reference mark spacings;

FIG. 6B3 is a linear view of part of the grating illustrating referencing movements;

FIG. 6B4 is a flow diagram of a referencing process;

DETAILED DESCRIPTION OF THE INVENTION

Figure 1:
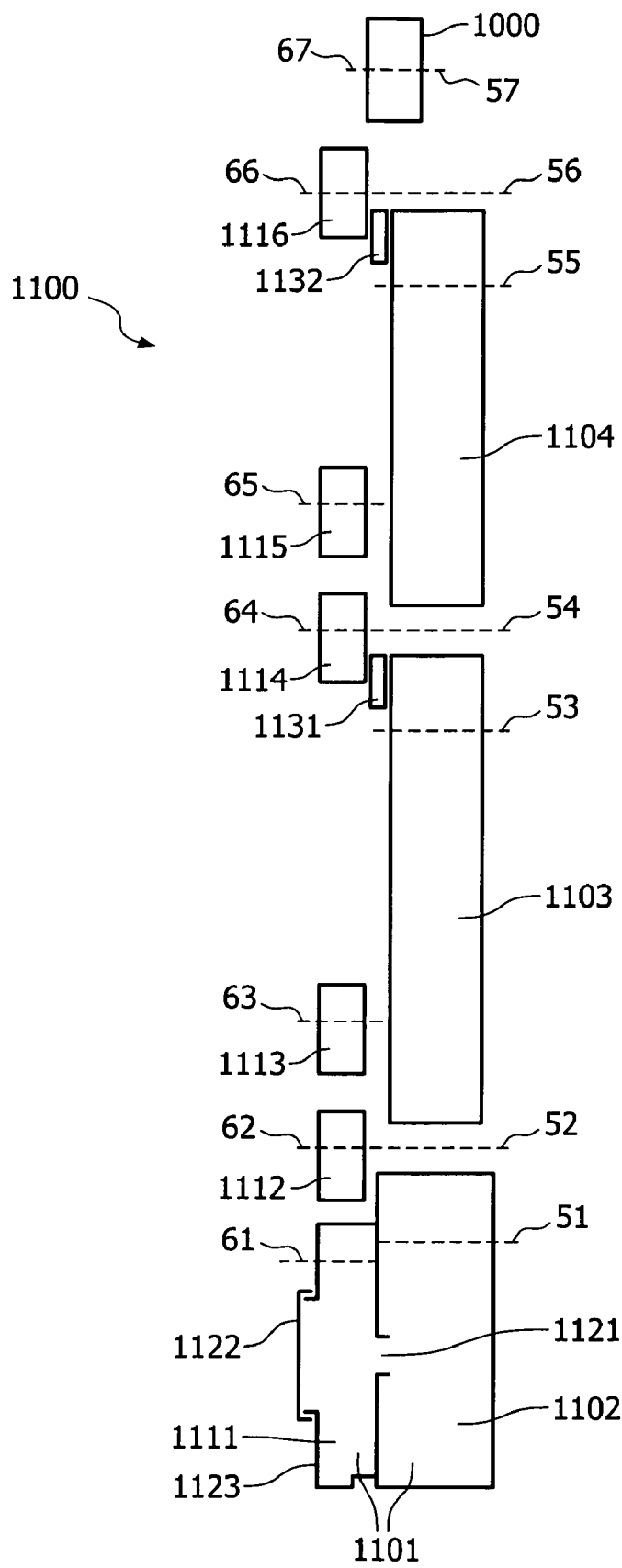
FIG. 1 is a schematic of the sealed volumes in a Robust RCA. The Arm is depicted in cross-sectional blocks.

Unless defined otherwise, all technical and scientific terms used herein have the same meaning as is commonly understood by one of skill in the art. All publications referenced herein are incorporated by reference thereto. All patents and patent applications referenced herein are incorporated by reference herein in their entirety including the drawings.

The articles "a" and "an" are used herein to refer to one or to more than one, i.e. to at least one of the grammatical object of the article. By way of example, "a button" means one button or more than one sample.

Throughout this application, the term "about" is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of components, and can also include 1.5, 2, 2.75 and 3.80, when referring to, for example, distances). It also includes the endpoints (e.g. e.g. 1.0 to 5.0 can include 1.0 and 5.0).

Reference is made in the description below to the drawings which exemplify particular embodiments of the invention; they are not at all intended to be limiting. The skilled person may adapt the invention and substituent components and features according to the common practices of the person skilled in the art.

First Embodiment

The first embodiment described herein is a Robust RCA with an exoskeleton. The Robust RCA may comprise an Internal CMM Arm and an Exoskeleton as described in WO 2004/096502 which is incorporated herein by reference. In the foregoing description, reference is occasionally made to the Figures of WO 2004/096502 (e.g FIGS. 1, 2, 10) and corresponding description, in regard of the Internal CMM Arm 5, Exoskeleton 6, probe end 3, probe 90, touch trigger probe 92, and contact force scanning probe 99. While terms themselves are self-explanatory for the skilled person, the figure reference signs are provided for the purpose of clarity.

Sealing

One embodiment of the present invention relates to an RCA comprising:

a movable member;

a movable position reporting device; and transmission means in contact with both said movable member and said movable position reporting device;

that is sealed from harmful ingress of fluids and solid objects.

As mentioned above, the movable member constitutes the robot. The movable position reporting device refers to the CMM Arm, and the transmission means refers to the mechanism that mechanically transmits the movements of the robot to the CMM arm. These elements together constitute an RCA. The RCA may have a particular configuration, referred to below, whereby the movable member element is a Robot Exoskeleton that encloses an Internal CMM Arm and manipulates the Internal CMM Arm via transmission means such that it can carry out measurement. The Robot Exoskeleton and the Internal CMM Arm can be rigidly attached at the base. The Robot Exoskeleton and the Internal CMM Arm have the same joint axis orientations and joint centres.

According to one embodiment of the invention, a Robust RCA is provided with localised seals. The Internal CMM Arm of the Robust RCA is sealed to IP54 at all its moving joints and wherever a cable penetrates such that there can be no ingress of liquid or solids inside the Internal CMM Arm. The Exoskeleton of the Robust RCA is sealed to IP54 wherever it is necessary to protect the components or joints, such as bearings and gear rings. The Transmission Means are sealed to IP 54 so that there is no ingress of liquid or solids at the transmission interface between the Internal CMM Arm and the Exoskeleton. Liquids and solids may penetrate between the Internal CMM Arm and the Exoskeleton.

Referring to FIG. 1, a Robust RCA 1100 comprises base sealed volume 1101, CMM Arm sealed volumes 1103, 1104, Exoskeleton sealed volumes 1112-1116, Transmission sealed volumes 1131, 1132 and Probe End Module sealed volume 1000. Base sealed volume 1101 comprises CMM arm volume 1102 and Exoskeleton volume 1111 interconnected by Base internal opening 1121. Base sealed volume 1101 further comprises a Control panel sealed door 1122 in its outer skin. Each sealed volume may be sealed to at least a minimum ingress protection rating. The sealed volumes 1101, 1103, 1104, 1112-1116, 1000, 1131, 1132 may be sealed from the environment to IP54. The sealed volumes 1101, 1103, 1104, 1112-1116, 1000, 1131, 1132 are mechanically interconnected by structures and mounting mechanisms in such a way as to perform the function of the Robust RCA 1100. Air, liquids, particulate solids and small foreign bodies can pass between the sealed volumes 1101, 1103, 1104, 1112-1116, 1000, 1131, 1132 without inhibiting the function of the Robust RCA 1100. Thus, once embodiment of the present invention is the Robust RCA as described above, wherein said movable member further comprises a plurality of linked sealed volumes and said movable position reporting device further comprises a plurality of linked sealed volumes such that fluids and small particles may pass between said movable member and said position reporting device.

The sealed volumes 1101, 1103, 1104, 1112-1116, 1000 may be electrically interconnected by cables in such a way as to perform the function of the Robust RCA 1100. Sealing may be achieved in a number of common ways including but not limited to bolted joints, shaft seals, gaiters, end caps, silicon sealant, sealing tape and 'O' ring seals.

In the case where a connecting segment comprises tubes with a significant air gap between them typically of several mm in thickness, liquid or solid particles are permitted to flow down between them. The shape of the surfaces of the Robust RCA 1100 may be provided such that they do not have concave areas in which liquids and solids can collect.

In operation, the CMM Arm and the Exoskeleton move relative to each other. There may be entrance gaps between the CMM Arm and the Exoskeleton. Entrance gaps between the CMM Arm and the Exoskeleton may be narrow enough and compliant enough such that solid bodies may not enter that are large enough to become trapped between the Internal CMM Arm and the Exoskeleton. In general, entrance gaps are provided in a form to deflect solid bodies and liquids from entering between the Internal CMM Arm and the Exoskeleton in most spatial orientations. In this way, medium-sized foreign bodies such as threaded fastening nuts or stones cannot enter into the volumes between the Internal CMM Arm and the Exoskeleton where they might jam and cause damage. Smaller foreign bodies will not be able to jam and can pass through.

Figure 2:
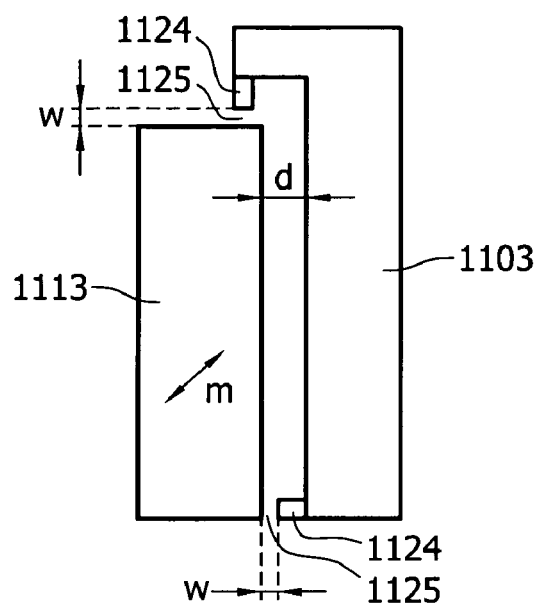
FIG. 2 is a diagram of apparatus for preventing the entry of large foreign bodies. The apparatus shows a volume and exoskeleton in cross-section.

Referring now to FIG. 2, CMM lower limb volume 1103 and Exoskeleton Joint 3 volume 1113 move relative to each other by a small amount, maximum 'm'. Entrance gap restriction means such as compliant deflectors 1124 are positioned to deflect solid bodies from entering into the gap between CMM lower limb volume 1103 and Exoskeleton Joint 3 volume 1113. Ingress between said movable member and said movable position reporting device of foreign bodies sizable enough to do damage is prevented by said entrance gap restriction means. The maximum size of foreign body permitted entry between said movable member and said movable position reporting device is smaller than the minimum gap between said movable member and said movable position reporting device as said movable member and said movable position reporting device move relative to each other. The minimum gap is explained below.

The width of the Entrance gaps 1125 is normally 'w'. The next smallest gap between CMM lower limb volume 1103 and Exoskeleton Joint 3 volume 1113 is 'd'. The maximum foreign body size that can enter between CMM lower limb volume 1103 and Exoskeleton Joint 3 volume 1113 is w+m at the point at which the Entrance gap 1125 is a maximum die to the relative movement between the CMM lower limb volume 1103 and the Exoskeleton Joint 3 volume 1113. Once a foreign body size w+m has penetrated between the CMM lower limb volume 1103 and the Exoskeleton Joint 3 volume 1113, the smallest gap it will encounter is d−m. The value for 'w' is therefore typically chosen such that w>m and w+m<d−m. It will be appreciated by a person skilled in the art that the scope of this invention is not limited to the above exemplary description of an apparatus for preventing foreign bodies of a size that may cause damage entering between the CMM Arm and the Exoskeleton whilst permitting smaller foreign bodies, liquids and particles to freely enter but includes any means of preventing foreign bodies of a size that may cause damage entering between the CMM Arm and the Exoskeleton whilst permitting smaller foreign bodies, liquids and particles to freely enter.

At the yokes in the shoulder, elbow and wrist of the Robust RCA, the yoke of the CMM Arm moves within the yoke of the Exoskeleton, providing opportunity for the insertion of a crowbar or similar object that might lead to significant damage as the joint closes or opens. Complete protection against what would probably be an act of sabotage is not provided, but the yoke of the Internal CMM Arm and the yoke of the Exoskeleton are complementarily provided in shape such that there are few orientations at which a crowbar or similar object might be lodged so as to do damage. Similarly, gaps at the extent of joint rotation are maintained to avoid the danger of finger pinching.

Figure 3:
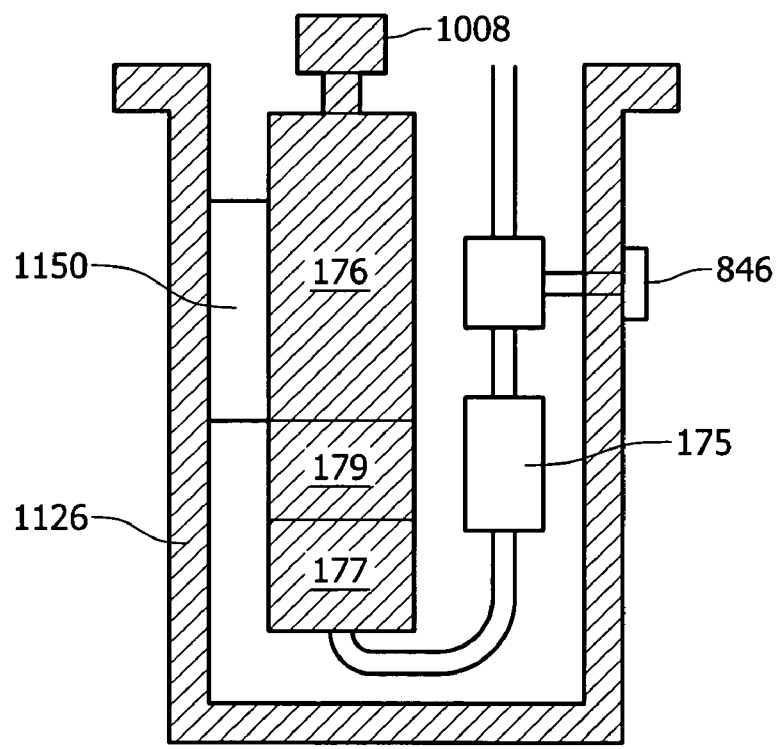
FIG. 3 is a section of a motor pod in cross-section.

Motors with gearboxes, encoders and brakes generally are not protected by motor manufacturers and do not have a significant IP rating. It is a purpose of this invention to provide a pod typically comprising a gearbox/motor/encoder/brake/anti-backlash assembly built into it and bolted onto the exoskeleton with a sealed interface. Thus one embodiment of the invention is RCA as described herein further comprising at least one motor pod means. Referring now to FIG. 3, a pod 1126 contains a motor/gearbox 176, spur gear 1008, encoder, 179, brake 177, amplifier 175, manual brake release system 846 and anti-backlash assembly 1150. The pod 1126, which is preferably cast from aluminium, provides IP54 ingress protection and also can conduct the heat generated in the motor/gearbox to the Exoskeleton; the pod also looks better and covers up the wiring. The base of the exoskeleton is preferably cast 1123. In this way, the motor/gearbox 176, spur gear 1008, encoder, 179, brake 177, amplifier 175, manual brake release system 846 and anti-backlash assembly 1150 are sealed within the shape of the base casting 1123 and the extra cost of providing a separate base pod 1126 is eliminated. A screw is provided for adjusting the anti-backlash assembly 1150 from outside the pod 1126 once the pod 1126 has been mounted onto the Robust RCA 1100. It will be understood by a person skilled in the art, that a pod 1126 can be provided in a variety of different configurations. For example, a pod 1126 can be provided without anti-backlash means. Alternatively, a pod 1126 can be provided without a manual brake release system 846. The scope of this invention includes a pod 1126 of any configuration containing at least a motor and drive output.

A control panel 1122 and an access panel are provided in the base casting 1123 and are sealed to IP54. One advantage of a cast base is the reduction in components; a cast base typically reduces component count by 8 items compared to an assembled base. At the probe end of the Robust RCA 1100, a Probe End Module 1000 is mounted that is self-sealed. The overall result is a Robust RCA 1100 that can survive water or small solid particles pouring onto it in any spatial orientation. This approach can be used for ingress protections in excess of IP54 or less than IP54. This embodiment does not require covers with many resulting advantages such as reduced tooling costs, quicker assembly and maintenance operations and reduced component count.

Figure 4:
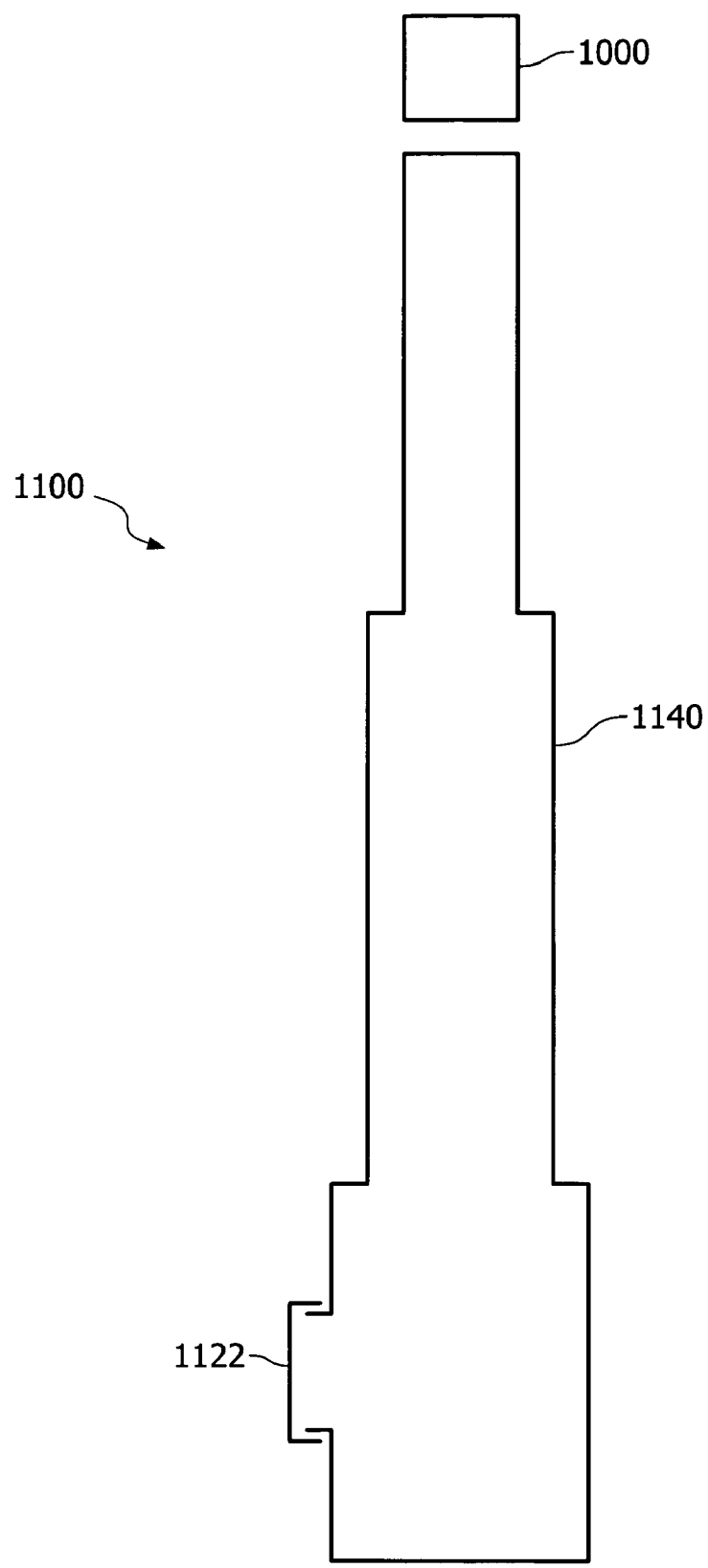
FIG. 4 is a schematic of a Robust RCA with single external sealed volume in plan view.

In a further embodiment of the present invention, an alternative approach of using covers is provided, such that the entire Robust RCA is sealed as a single volume and there is no penetration of liquids or solid particles between the Internal CMM Arm and the Exoskeleton or within the single volume. Referring to FIG. 4, a Robust RCA sealed volume 1140 encloses the Internal CMM Arm and Exoskeleton. A sealed Probe End Module 1000 is mounted at the Probe End. Alternatively, a Probe End Module 1000 that is not sealed at the mounting face, may form a single volume with the Robust RCA 1100 when mounted. Bellows are used at the yokes to seal the gap where the Internal CMM Arm moves through the Exoskeleton cover. Typically around 20 covers are required for a Robust RCA 1100 that is sealed at the Exoskeleton. Each cover is sealed to its mating surface. There is no need to seal some of the joints of the Internal CMM Arm unless a secondary protection level is required.

It will be understood by a person skilled in the art, that a Robust RCA 1100 is an RCA with sufficient sealing that is provided with a single sealed volume or a plurality of sealed volumes and that the scope of this invention is not limited to the exemplary arrangements of volumes disclosed above, but includes any RCA with one or more sealed volumes. In particular, more robust RCAs of this invention may be provided comprising sealed volumes within sealed volumes to one or more levels of sealing.

Ethernet

Figure 5:
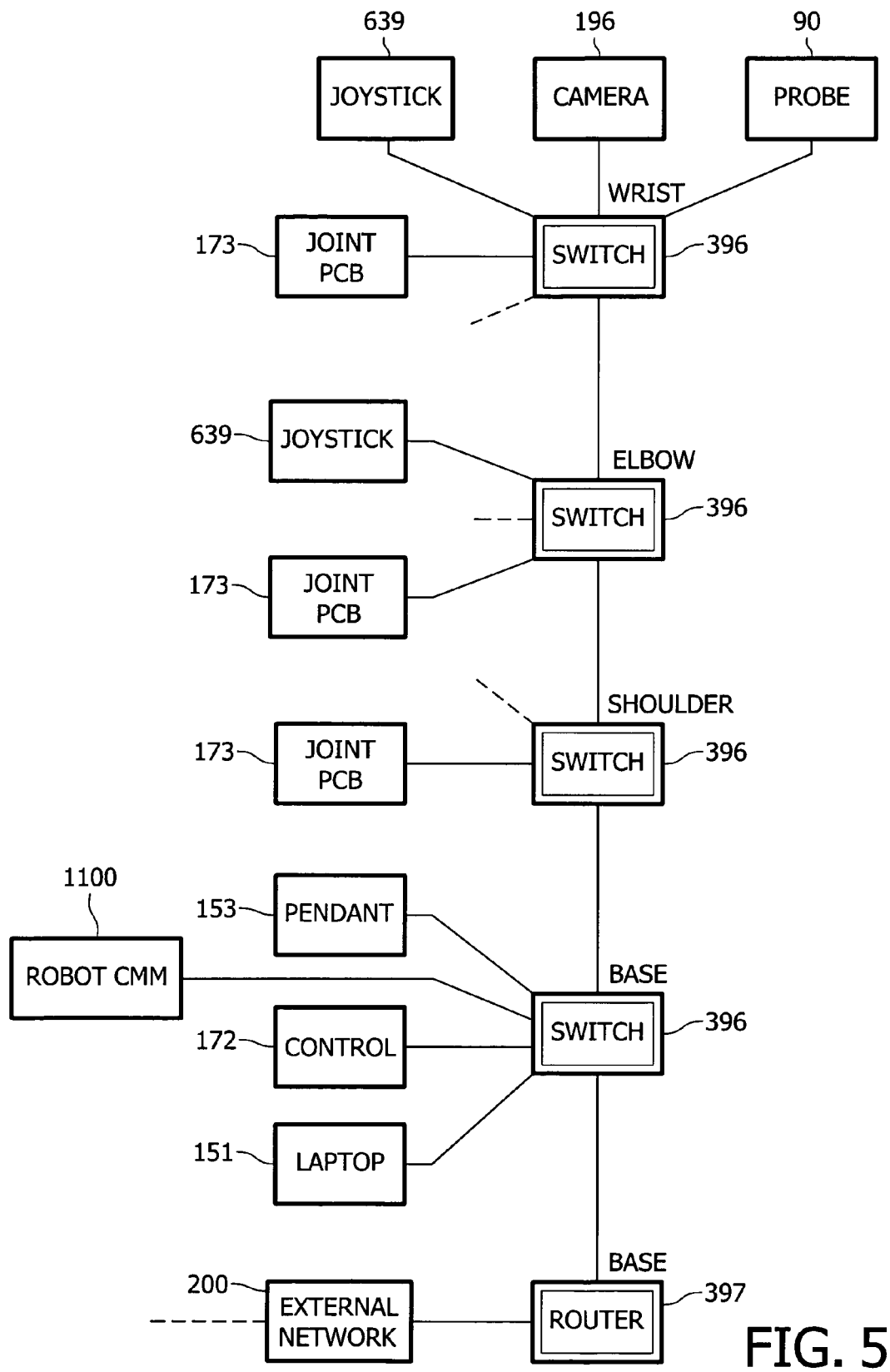
FIG. 5 is a schematic of an Ethernet system with router for a Robust RCA.

The robustness of an ethernet-based RCA architecture may be increased by means of the addition of a gateway/router between the Robust RCA ethernet system and any external ethernet system to which it may be attached. The router may act as a firewall, preventing activity on the external Ethernet system from degrading the performance of the Robust RCA Ethernet system. Referring to FIG. 5, a Router 397 may be connected between an external network 200 and a switch 396 in the base of the Robust RCA 1100. A series of switches 396 may be connected up the Robust RCA 1100. The base Switch 396 further connects to the Control PCB 172, Pendant 153, PC laptop 151, further Robust RCAs 1100 and the next Switch 396 at the shoulder. The shoulder Switch 396 further connects to the Joint PCB 173, and the next Switch 396 at the elbow. The elbow Switch 396 further connects to the Joint PCB 173, a joystick 639 and the next Switch 396 at the wrist. The wrist Switch 396 further connects to a probe 90, a camera 196, a joystick 639 and a Joint PCB 173. Ethernet switches with extra ethernet connections are provided at the shoulder, elbow and wrist joints on the Robust RCA Ethernet system for users to add ethernet devices such as ethernet still/video cameras or switches/joysticks for manual control of the Robust RCA. The addition of a gateway/router to the Robust RCA ethernet system permits the use of Ethernet for motion control between the controller and intelligent amplifiers using the Ethernet Powerlink protocol. In cells, where two or more Robust RCAs are connected, the two or more Robust RCA Ethernet systems can be directly connected. It will be appreciated by those skilled in the art, that the scope of this invention is not limited to the Ethernet type of network, but includes any type of network that can be sealed from undesirable external use by means of a router. For instance, a Switch 396, can also include the functionality of a Router 397 such that space and cost may be saved by providing one component with combined functionality. Thus, another embodiment of the present invention is an RCA as described herein further comprising an internal Ethernet system, an external Ethernet system and a gateway between said internal Ethernet system and said external Ethernet system.

Control Loop

Figure 6:
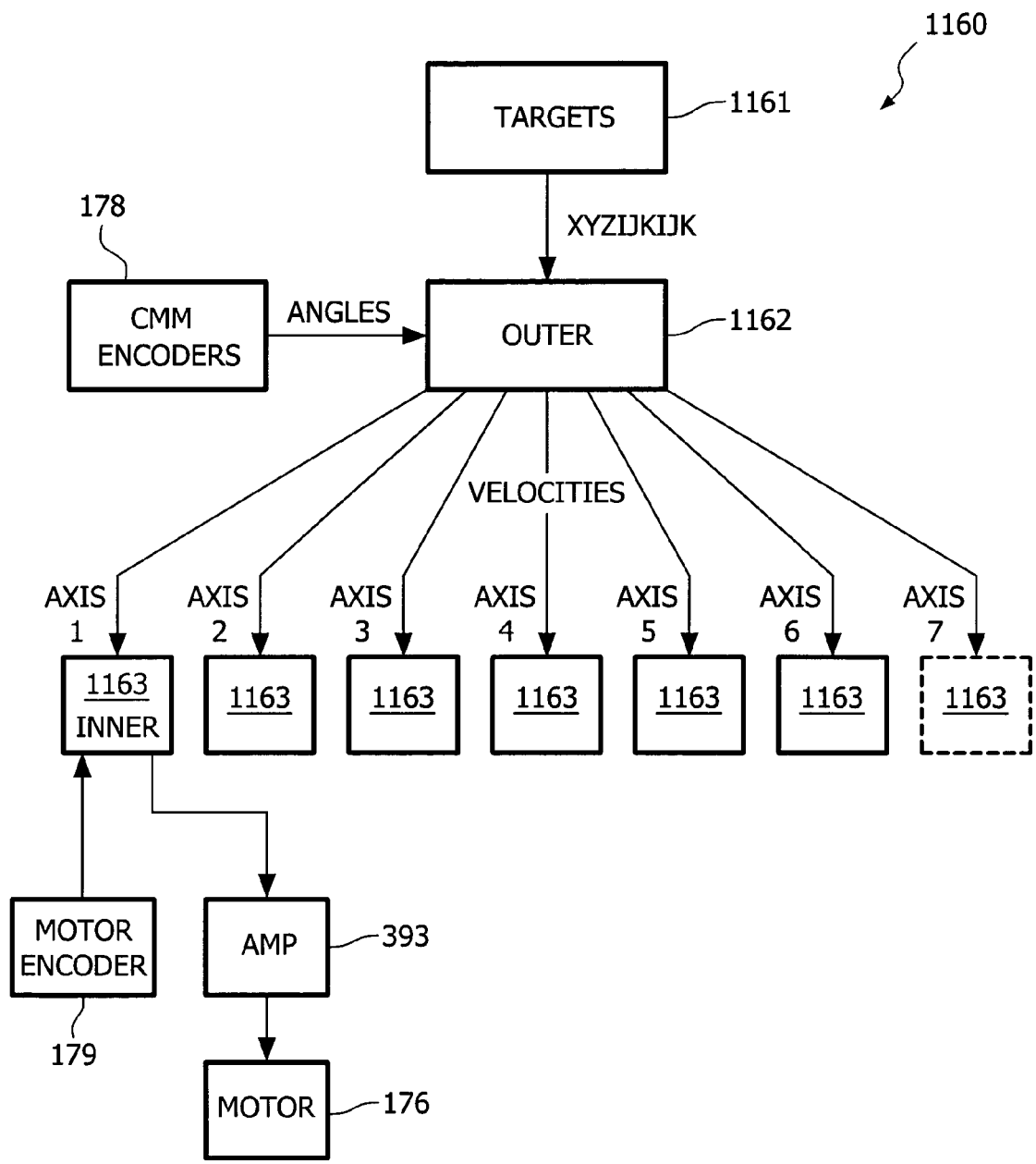
FIG. 6 is a schematic of a control architecture for a Robust RCA.

In an embodiment of the control system for this Robust RCA an outer position control loop is used to generate velocities for an inner velocity control loop for each joint and the inner velocity control loop maintains the velocity for that joint. The outer control loop uses Inverse Kinematics and considers all the joints in the Robust RCA as a whole. The input to the outer control loop is the angular position feedback from the rotary encoder on the Internal CMM Arm joint. Referring now to FIG. 6, a Control Architecture or system 1160 comprises an Outer control loop 1162 with input rotary angles from the CMM encoder 178 on each axis and pre-planned Targets 1161. The Outer control loop 1162 outputs demand velocities to the Inner Control Loop 1163 for each axis. The Inner Control Loop 1163 receives further input from the Motor Encoder 179 and outputs control signals to an amplifier 393 which drives a motor 176. The outer loop closure time is constant but could be variable. Typical outer loop closure times vary from 1 msec to 15 msecs. Each joint Inner control loop 1163 has the task of achieving and maintaining a demand velocity and solutions to this task are well known to those skilled in the art. A typical inner loop closure time is 1 msec. Updates to the demand velocity can arrive at the Inner control loop 1163 every 1 to 15 msecs. The motor encoder 179 on the Exoskeleton joint and the rotary encoder 178 on the Internal CMM Arm joint typically provide different joint angle position traces during a movement of the joint. Differences between the two encoder traces are caused by mechanical effects such as link length difference, joint alignment, compliance in the transmissions, backlash in one or more of the drives and rapid slips in one or more of the transmissions characterised by 'stiction' stick/slip friction.

The Control Architecture or system 1160 can be implemented in device with a plurality of means for performing at least the tasks of the outer and inner loops. It may alternatively by implemented as a computer program stored on a computer readable medium, which program perform the above mentioned steps.

One embodiment of the present invention is a system for controlling an RCA comprising an outer control loop, and an inner control loop for each axis, whereby
the outer control loop receives angular position feedback from a rotary encoder on an RCA joint,
the outer control loop provides demand velocities to the inner control loop for each axis
the inner control loop receives demand velocities from the outer control loop and from a motor encoder,
the inner control loop provides control signals to drive a motor.

One of the objects of the Robust RCA 1100 invention is for it to follow a motion path to a very high accuracy. Each point along a planned path can be mathematically defined as XYZ-IJKLIK, which enables the definition of the path of the Robust RCA and the sensor attached at the Probe End. Conventional Robot Inverse Kinematics is employed based on transposed Jacobeans. In each position control loop closure, a partial differential equation is generated and used to generate joint vectors from an end-effector demand vector. These joint vectors are fed back in an iterative approach to generate a new partial differential equation until adequate convergence is achieved. The iterations occur within a single outer loop position closure cycle. The number of iterations needed reduces with the loop closure time. The outer loop position control approach used is to use as targets a pre-generated series of demanded intermediate targets that are typically separated by a time factor of at least the outer control loop closure time interval that is typically 1 to 15 msecs. The outer loop position control 1162 generates updated demand velocities for each joint's inner loop position control 1163. The inner control approach is to use velocity control to enable the Robust RCA to pass through each of the series of intermediate targets with the minimum of error. The scope of this invention is not limited to an Outer control loop 1162 with a fixed loop closure time, but could have a variable loop closure time that depends at least on the number of iterations taken to converge to an adequate accuracy.

In an alternative embodiment of the control system for this Robust RCA, a single control loop is used. The encoder on the Internal CMM Arm joint has high gain input into the controller's position loop and satisfies the requirement for accurate positioning of the Robust RCA. The encoder on the motor on the Exoskeleton joint has high gain input into the controller's velocity and acceleration loops. Thus according to one aspect of the invention, an RCA as disclosed herein further comprising encoders on said movable member, encoders on said movable position reporting device and a controller characterised by high gain input from said encoders on said movable position reporting device into said controller's position control loop and high gain input from said encoders on said movable member into said controller's velocity and acceleration control loops.

In a further embodiment of the control system for this Robust RCA, a single control loop is used for rapid traverses in which the accuracy of the path is not important. A calibration is made of the Exoskeleton using a method used in calibrating industrial robots. The controller simply controls the Exoskeleton without any position feedback from the rotary encoders on the Internal CMM Arm.

It is a requirement for measurement and high accuracy control that the probe on the end of the Internal CMM Arm can be held steady under servo control, or accurately follow a predetermined XYZIJKIJK path in an absolute coordinate system. To do this, each motor encoder 179 on an Exoskeleton joint must have sufficient resolution when multiplied by the gear ratio. Typically, this is at least 0.1 micron of probe movement per edge on the encoder.

Bearing Calibration

A bearing in a joint of the Internal CMM Arm does not rotate perfectly about an axis. In practice there is a degree of runout. The bearing runout has two components: a characteristic and repeatable trace that repeats every revolution and a random runout noise that varies with any movement. Tests have shown that the repeatable trace accounts for much of the runout and is invariant over the useful bearing lifetime of a well-sealed bearing. Each joint in the Internal CMM Arm has two opposing bearings on a shaft in a housing separated by a distance that is typically 50-150 mm. If the two bearings are separated by 100 mm and each bearing axis moves 1 micron in opposing directions, then the error 1 m away from the centre of the joint is 20 microns. A Robust RCA can be made more accurate by calibrating each joint for the repeatable runout in the bearings and saving the calibration in a bearing calibration file. Calibration of a joint takes place in a purpose built jig. The joint housing is mounted in the jig. Spheres are temporarily mounted on each end of the joint's shaft for which purpose reference bores are provided at each end of the shaft. Four contact linear displacement sensors run on the large diameter of each sphere at 90 deg intervals. Each of the 8 linear displacement sensors has a resolution of the order of 50 nanometres. A rotary encoder is attached to the end of the shaft. The shaft is slowly rotated manually or by means of a motor. Data from the rotary encoder and eight linear displacement sensors is collected for several forward and several reverse rotations of the shaft. An advantage of providing four linear displacement sensors at each sphere is that the fixed error offset of the sphere centre from the shaft centre is automatically compensated for by averaging the data from each pair of opposing sensors. A joint calibration file is simply calculated to provide the average runout at each end of the shaft with shaft angle. The joint calibration file is used in the process for calibration of the Robust RCA. The joint calibration file is saved in a memory chip bonded to the joint such that if a joint on the Robust RCA is replaced, then the joint calibration file on the new joint will be automatically used on recalibration. During use of the Robust RCA, the calibration incorporates the joint calibration file data to increase the accuracy of the measurements and/or path followed.

Thus another embodiment of the invention is an RCA as described herein wherein said movable position reporting device further comprises at least one bearing pair wherein said at least one bearing pair is calibrated to produce calibration data and said calibration data is used to increase the measurement accuracy. A further embodiment of the invention is an RCA as described herein wherein said movable position reporting device further comprises at least one bearing pair wherein said at least one bearing pair is calibrated to produce calibration data and said calibration data is used to increase the accuracy of path following. A still further embodiment of the invention is an RCA as described herein wherein said movable position reporting device further comprises at least one bearing pair and a plurality of displacement sensors arranged to measure the runout of each bearing.

In a further embodiment of this invention, linear displacement sensors are permanently built into each joint of the Robust RCA. This has the advantage of compensating for both characteristic runout and noise runout.

The Internal CMM Arm is calibrated in a standard way and there is no need to calibrate the Exoskeleton. The Internal CMM Arm calibration incorporates the joint calibration files for each joint to make the Internal CMM Arm calibration more accurate. Calibration occurs typically after manufacture and before shipment. It may also occur after a maintenance operation has taken place, or at time intervals specified by the user.

Compensation

Compensation or counterbalancing of the arm is achieved with a machined spring at the shoulder yoke joint. On assembly or production lines, a Robust RCA is required with a shoulder joint that can go backwards past the vertical as well as forwards, to maximise utility in a variety of measurement tasks. A machined spring is provided that coils to support the arm against gravity in the forward direction and uncoils to support the arm against gravity in the backward direction. Alternatively, the spring could coil and uncoil in the opposite directions. The weight of the Robust RCA to be supported varies with the cosine of the angle from the vertical. The supporting force of the machined spring is linear with the angle from the vertical. This means that a linear machined spring cannot provide perfect compensation for all spatial orientations of the Robust RCA. With a fixed machine spring, the spring force is present in all angles except at vertical. This is sub-optimal for providing the most support of the arm to minimise energy consumption and maximise mechanical life. It is a purpose of this invention to give the machined spring an angle of non-energy in which the normally captive end of the machined spring is free to move between two stops. A typical angle is 25 degrees of unwound movement in the machined spring during which the machined spring stores negligible energy. For each different arm length, the optimum unwound angle is different for a fixed spring constant. This unwound angle can be changed by adjusting the two stops situated at each end of the travel. The Robust RCA is typically provided in a range of six arm lengths. This would normally require six different machined springs, each with a different spring constant. By utilising the unwound angle, only two different machined springs with different spring constants are typically required. In production, machined springs are heat treated and there is a resulting variability in spring constant. The two adjustable stops permit the machined spring to be optimally adjusted for both forward and backward winding.

Anti-Backlash

Most gearing systems have an amount of backlash in them. Harmonic Drive joints do not have backlash. In the case of robots, this backlash at a joint can lead to vibrations that reduce the life of the RCA. The market demands ever faster movement of robots and vibrations normally increase with increased acceleration. It is a purpose of this invention to provide a Robust RCA that is less prone to vibration with Harmonic Drives at the yoke joints and anti-backlash means at the axial joints. Anti-backlash is preferably provided by a split gear ring with the two halves forced apart with spring pressure. The spur gear is preferably driven through a Harmonic Drive gearbox to eliminate backlash upstream in the drive chain. Alternative anti-backlash is provided when the spur gear and associated motor, gearbox are sprung so as to press the spur teeth against the teeth of the gear ring.

Base Assembly

It is desirable for the Exoskeleton and CMM bases to move relative to each other such that stresses on the Exoskeleton are not transferred via the Exoskeleton base onto the CMM base. In this way, the accuracy of the CMM is unaffected by the work of the Exoskeleton. It is also desirable for the CMM base to locate with a high degree of repeatability when one Robust RCA is replaced with another. A further requirement is ease of location of the Robust RCA. It is also desirable that the Base assembly not rattle and that it is robust and not easily damaged. The combination of these requirements have led to the invention of a novel Base Assembly. It is an object of this Robust RCA invention that a base assembly is provided that permits limited relative movement of Exoskeleton and CMM bases, is easy to locate, has high repeatability of CMM alignment and is robust. This novel base is now disclosed with reference to FIGS. 6A1, 6A2, 6A3, 6A4.

Referring now to FIG. 6A1, a Base Assembly 1190 comprises CMM Segment1 31 of an Internal CMM Arm 5 and Exoskeleton Segment1 41 of an Exoskeleton 6. Exoskeleton Segment1 41 and CMM Segment1 31 are connected with two Compliant Joints 1191 such that CMM Segment1 31 may move by a limited amount in at least one degree of freedom relative to Exoskeleton Segment1 41. This means that if the Exoskeleton Segment1 41 is lifted, then CMM Segment1 31 will also be raised. The compliant joints 1191 will contain a compliant material such as rubber or foam so as to avoid rattling of the CMM Segment1 31 within the Exoskeleton Segment1 41 during transport of the Robust RCA 1100. Exoskeleton Segment1 41 further comprises six protruding Rim segments 1193. CMM Segment1 31 further comprises two protruding Tooling dowels 1194. Referring now to FIG. 6A2, a Plate 1192 is provided onto which the Base Assembly 1190 of the Robust RCA 1100 is mounted. The Plate 1192 contains six Groove segments 1195, a location hole 1196 and a location slot 1197. Referring now to FIG. 6A3, the geometric layout of the Base assembly 1190 is shown. The six Rim segments 1193 comprise alternating shorter and longer segments. Referring now to FIG. 6A4, the geometric layout of the Plate 1192 is shown. The six Groove segments 1195 comprise alternating shorter and longer segments. Three unique and easily distinguishable Markings 1198 are provided on the Plate 1192 and comprise a circle, square and triangle. These three unique Markings 1198 align with matching Markings 1198 that are also a circle, square and triangle (not shown in the Figures) on the Base Assembly 1190.

The operator manually slides the Robust RCA 1100 on the Rim segments 1193 of its Base Assembly 1190 across the flat reference surface of the Plate 1192. Whilst sliding, the Tooling dowels 1194 are so arranged as to be just clear of the surface of the Plate 1192. The operator visually positions the Robust RCA 1100 to align the two sets of Markings 1198 such that the Markings 1198 match. The six Groove segments 1195, location hole 1196 and location slot 1197 of the Plate 1192 are arranged geometrically to match the six protruding Rim segments 1193 and the two protruding Tooling dowels 1194 of the Base Assembly 1190 so that the Base Assembly 1190 can sink into the Plate 1192 when they are correctly aligned with the two sets of Markings 1198 in alignment. The Rim segments 1193 are alternately arranged into short and long segments such that the Rim segments 1193 of the Base Assembly 1190 cannot partially locate into the Groove segments 1195 of the Plate 1192 such that the Robust RCA 1100 is always supported on at least 3 segments and cannot tip into or become jammed in the Groove segments 1195. The Rim segments 1193 are tapered so that the operator need only roughly align the Robust RCA 1100 for it to slip down into the Groove segments 1195. There is a loose tolerance of the Rim segments 1193 in the Groove segments 1195 of typically 0.25 mm, to allow for differential thermal expansion and machining tolerances. The Tooling dowels 1194 are also tapered. As the Robust RCA 1100 slips down into the Plate 1192, the Tooling dowels 1194 separately locate the CMM Segment1 31 into the Plate 1192. The location of the CMM Segment1 31 in the Plate 1192 is to a very high tolerance of typically around 0.025 mm. The location Slot 1197 allows for any differential thermal expansion and machining tolerances between the CMM Segment1 31 and the Plate 1192. The Plate 1192 is robust such that any changing loads placed on it by the fixings of Exoskeleton Segment1 41 do not distort Plate 1192 and do not significantly affect CMM Segment1 31 that is affixed to Plate 1192. The plate 1192 is typically made of a very stiff material and is of considerable thickness. A typical material would be granite of 100 mm thickness. The tolerances on all the alignment means 1193, 1194, 1195, 1196, 1197, the dimensions of their tapers and the movement of the Compliant joint 1191 need to be carefully controlled such that the Exoskeleton Segment1 41 does not sink into the Plate 1192 leaving the CMM Segment1 31 unlocated and resting on its two Tooling dowels 1194 on the Plate 1192. In a preferred embodiment, the radial fit between CMM Segment1 31 and Exoskeleton Segment1 41 is a sliding fit.

One embodiment of the present invention is a Robot CMM as disclosed herein further comprising a base assembly that:
  permits limited relative movement between the base of said movable member and the base of said movable position reporting device;
  is easy to locate manually;
  is robust;
  has high repeatability of alignment of said movable position reporting device.

It will be appreciated by those skilled in the art, that this embodiment is not the only way of providing a suitable base assembly and that the scope of this invention is not limited to this embodiment but includes any embodiment with a base assembly that permits limited relative movement of Exoskeleton and CMM bases, is easy to locate, has high repeatability of CMM alignment and is robust.

Absolute Reference Position

Accurate measurement takes place in each encoder of the Internal CMM Arm 5. A rotary encoder grating on a Joint of the Internal CMM Arm 5 typically has 16,384 lines and one reference mark. This means that each time a Robust RCA 1100 is powered up, the Joint must be moved under power until the reference mark passes through a reference mark sensor in a read head. This can only occur at one angular orientation and often requires significant movement of up to 360 degrees. This referencing movement takes time and can also be inconvenient if the Robust RCA 1100 is surrounded by other equipment such as in an assembly line environment. Unless a separate absolute position feedback device such as a potentiometer is provided on each Joint, there is a problem for automated referencing of not knowing even roughly the angle of each Joint. Potentiometers are an additional source of manufacturing and maintenance cost, increase system complexity and reduce system robustness. If powered referencing is carried out in the wrong direction, then hard bump stops can be impacted. It is therefore usual to have a skilled operator manually carry out the power-up referencing. It is a further object of this Robust RCA 1100 invention to provide a novel apparatus and method of automatically and quickly referencing the Internal CMM Arm without substantial movements of the Robust RCA 1100.

This novel apparatus and method of referencing the Internal CMM Arm without substantial movements of the Robust RCA 1100 is now disclosed with reference to FIG. 6B1. A Rotary Encoder Optical Grating 1200 mounted on one side of a Joint 1205 comprises 16,384 Encoder lines 1202 on a 104 mm pitched circle diameter and 362 Reference Marks 1201. The Rotary Encoder Optical Grating 1200 is 108 mm in diameter and made of glass with one side facing the four Read Heads 186 mounted on the other side of the Joint 1205. The Encoder lines 1202 have uniform separation between each pair of 20 microns. Each Reference mark 1201 is centred on an Encoder line 1202. There is a Spacing 1203 between each pair of Reference marks 1201. The minimum Spacing 1203 between two neighbouring Reference marks 1201 is 27 lines; if the Spacing 1203 was closer than 27 lines, then the Reference mark sensor on the Read Head 186 could give an inaccurate result. The Reference Marks 1201 are laid out on the Rotary Encoder Optical Grating 1200 in a coded pattern based on a variable Spacing 1203 in Encoder Lines 1202 between neighbouring Reference marks 1201. To allow for error from alignment, thermal and optical factors, the minimum difference between any neighbouring pair of Spacings 1203 is two Encoder lines 1202. A Setting mark 1209 is engraved once on the Rotary Encoder Optical Grating 1200 to guide the operator in correctly orienting the Rotary Encoder Optical Grating 1200 during the assembly of the Joint 186.

With reference to FIG. 6B2, a List 1204 is provided of Spacings 1203 in units of Encoder Lines 1202 in order around the 360 degrees of the Rotary Encoder Optical Grating 1200 such that the first Spacing 1203 in List 1204 with a value of 27 Encoder Lines 1202 is adjacent to the last Spacing 1203 with a value of 67 Encoder Lines 1202. The sum of the Spacings 1203 in the table is equal to 16,384 which is the total of Encoder lines 1202 on the Rotary Encoder Optical Grating 1200. Each pair of neighbouring Spacings 1203 is unique. The smallest distance across a pair of Spacings 1203 is 27+29=56 Encoder lines 1202; the largest distance across a pair of Spacings 1203 is 57+67=124 Encoder lines 1202.

With reference to FIG. 6B3, on power-up, the Joint 1205 is traversed in a continuous positive direction from the Start Angle 1206 until three Reference Marks 1201 labelled R2,R3,R4 are read whilst counting Encoder lines 1202 using methods known to a person skilled in the field and resulting in three Encoder line counts 1207 labelled COUNT2, COUNT3, COUNT4 corresponding to the three sequential Reference marks 1201 R2,R3,R4. The two Spacings 1203 labelled S2, S3 in Encoder lines 1202 between the three Encoder line counts 1207 COUNT2, COUNT3, COUNT4 are obtained by subtraction: S2=COUNT3−COUNT2 AND S3=COUNT4−COUNT3. This pair of neighbouring Spacings 1203 S2, S3 are then located in their unique location on List 1204. This location provides sufficient information for referencing of the Joint 1205 without any further movement of the Joint 1205. The Angular Arc 1208 'A' of movement of the Joint 1205 during referencing in Encoder lines 1202 is the sum of the two Spacings 1203 S2, S3 plus most of Spacing 1203 S1 plus a small amount for acceleration and deceleration. This Angular arc 1208 A can be reduced to just over two Spacings 1203 by changing direction on encountering the first Reference Mark 1201 R2 and proceeding backwards over two Spacings 1203 S1, S0. The reduced Angular arc 1208 'B' between the maximum positive angle and the maximum negative angle during Referencing is from 1 to 3 degs depending on the location of the Start angle 1206 on the Rotary Encoder Optical Grating 1200.

The scope of this invention if not limited to this embodiment but includes all embodiments of a Robust RCA 1100 for automatically and quickly referencing the Internal CMM Arm without substantial movements of the Robust RCA 1100. For instance, the Angular arc 1208 can be significantly less than 1 deg or significantly more than 3 degs. The minimum spacing of Encoder lines 1202 to avoid Reference Mark reading inaccuracies may be more or less than 27. The increment of encoder lines in the pattern may be 1 or more than 2. The Rotary Encoder Optical Grating 1200 may have less or more lines than 16,384. The number of Read heads 186 can be one, two or more. The number of Spacings 1203 necessary for referencing can be 1 or more than 2. If the number of Spacings 1203 necessary for referencing is one then each Spacing 1203 in List 1204 will be a unique integer number of Encoder lines 1202. A List 1204 of Reference Mark Spacings 1203 can be generated by someone skilled in the field to suit any valid embodiment of this invention. The List 1204 can be used by someone skilled in the field to design a mask for manufacturing a compatible Rotary Encoder Optical Grating 1200 with the appropriate Spacings 1203 for the Reference Marks 1201 defined by the List 1204.

Referring now to FIG. 6B4, a method is provided for referencing a Joint 1205 of an Internal CMM Arm 5 of a Robust RCA 1100. In a first step 1210, the Joint 1205 is rotated until a Reference mark 1201 is located. In a second step 1211, the count of the first Reference mark is stored as COUNT 1. In a third step 1212, the Joint 1205 is rotated until a second Reference mark 1201 is located. the Joint 1205 is rotated until a neighbouring Reference mark 1201 is located. In a fourth step 1213, the count of the second Reference mark is stored as COUNT 2. In a fifth step 1214, the Spacing 1203 between the two reference marks 1201 is calculated as SPACING=COUNT 2−COUNT 1. In a sixth step, look up the Spacing 1203 on the List 1204 to give the reference position of the Rotary Encoder Optical Grating 1200.

The scope of this invention if not limited to this method but includes all methods for automatically and quickly referencing the Internal CMM Arm without substantial movements of the Robust RCA 1100. For example, the number of Reference marks 1201 located could be 3 or more and the number of Spacings 1203 calculated could be two or more. The number of Readheads 186 used to locate Reference marks 1201 could be 2 or more in order to reduce the Angular arc 1208 and hence the chance of a collision due to movement of the Robust RCA 1100 during referencing. The referencing of each Joint 1205 of the Robust RCA 1100 can be started at any time with respect to the other joints; the most time efficient method is to reference all Joints 1205 at the same time. Referencing can all be in one direction or there can be a change of direction. Each Joint 1205 can have an operator settable search direction in which the operator sets the direction of movement as the one least likely to cause a collision. If a Bump stop is impacted during the referencing of a Joint 1205, the process can be halted and a new process followed to find Reference marks 1201 in the other direction.

One embodiment of the invention is an RCA 1100 as disclosed herein further comprising joint referencing means comprising a large number of reference marks on a grating with variable spacing between said reference marks.

Another embodiment of the invention is a method for referencing a joint of an RCA 1100 as disclosed herein comprising the following steps:
- locating a plurality of reference marks;
- subtracting the locations of each of said reference marks with respect to the location of its neighbouring reference mark to determine the one or more spacings between said reference marks;
- looking up said one or more spacings in a list to reference said joint.

Thermally Stable Internal CMM Arm

It is an object of this invention to make the accuracy of a Robust RCA 1100 more stable under fluctuating thermal conditions that are observed with changes in motor power output and arm orientation. An Internal CMM Arm 5 typically comprises three carbon fibre tubes that have a low coefficient of thermal expansion linked by several joints made from Aluminium. Aluminium has a relatively high coefficient of thermal expansion which provides two problems for each aluminium component: (a) its expansion with temperature has to be measured and compensated for; (b) it has to be designed and manufactured to be thermally symmetric to eliminate bending and twist during thermal expansion. There can be as much as 600 mm of aluminium length between the base and the tip of an Internal CMM Arm 5; with 15 C of temperature change, this can extend the arm by 0.2 mm. The aluminium is typically situated in the following areas with the aluminium percentage of arm length in each region given in brackets: Base (5%), Shoulder Joint (32%), Elbow joint (24%), Wrist joint (20%) and Probe End Module (19%). When different layers of carbon fibre each with different thermal expansion/contraction properties are combined, the overall effect can be to produce near zero change in length with significant temperature changes. This technique is established for symmetrical objects such as tubes.

An embodiment of a Robust RCA 1100 is disclosed in which most of the aluminium in the Base (5%) and Probe End Module (19%) is replaced with symmetrical carbon fibre structures. The remaining 76% of aluminium length is in the three non-symmetric yokes at the shoulder, elbow and wrist. Most of the aluminium length in the 3 yokes is accounted for by 6 components currently made from cast aluminium. In a further embodiment of this Robust RCA 1100 invention, these six components are laid up using layers of carbon fibre in moulds. The shape of the moulds and the combination of layers is carefully designed to minimise thermal expansion whilst maximising stiffness. This means that nearly 100% of the length of the Internal CMM Arm 5 is comprised of thermally neutral material.

Infinite Joints

In this embodiment of this invention targeted at extensive manual actuation of the Robust RCA 1100, one or more of the axial joints can be provided with infinite rotation without limit in which case cables pass signals through infinitely rotating contact rings at the joints in ways known to those skilled in the trade. With manual actuation of a Robust RCA 1100 with infinite rotation of the axial joints, the arm will be easier to use. In a further embodiment, an optical emitter and receiver can be paired in the centre of an infinitely rotating joint, operable with the emitter and receiver at any axial orientation to each other, and data can be sent across it at high bandwidth.

Second Embodiment

A second main embodiment of the invention concerns an RCA that can be manipulated manually with ease, without complexity or operator fatigue and whilst maintaining a consistent level of accuracy in the output data.

In foregoing description of the second embodiment the RCA 1 having such enhanced manual control is described by reference to the device of FIG. 10. However, the description is in no way limited to this embodiment. The RCA 1 may include other elements. The RCA having enhanced manual control of the present invention may, for example, be the Robust RCA 1100 described above, adapted according to the second embodiment and depicted in FIG. 7. It may be an RCA whereby the robot is in an exoskeleton configuration as depicted in FIG. 11. Thus, an RCA 1 as described below refers to any RCA, including the Robust RCA 1100 described above, and the Exoskeleton RCA 17 described in FIG. 11, and includes RCAs known in the art.

Figure 10:
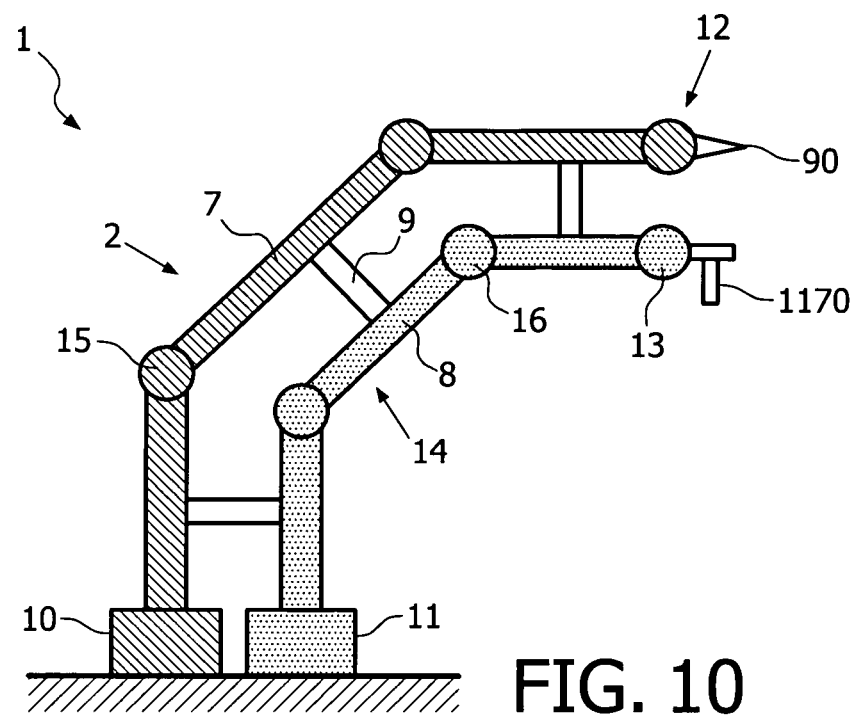
FIG. 10 is a schematic Figure of an RCA provided with a sensing handle.
Figure 11:
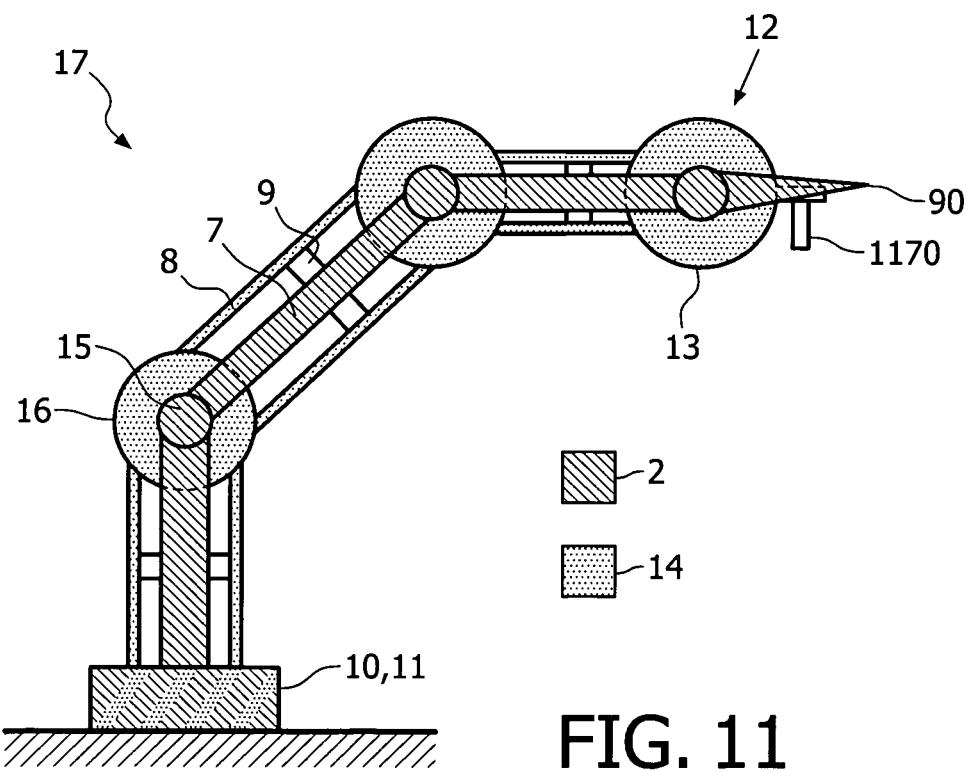
FIG. 11 is a schematic Figure of an RCA having an robot exoskeleton, provided with a sensing handle.

With reference to FIG. 10, an RCA 1 with enhanced manual control comprises a typical RCA. Such typical RCA comprises a robot 14 i.e. a movable member comprising two or more links 8 connected by joints 16 which robot movements are powered by mechanical means such as servo or hydraulic components. The robot 14 is usually mounted on the floor via a base 11. Robots 14 are well known in the art. A second element of a typical RCA is a CMM arm 2 i.e. movable position reporting device comprising two or more links 7 connected by intervening joints 15. The CMM arm 2 may be mounted on the floor via a base 10. As already explained above, the CMM arm 2 can calculate the position of the probe end 12 with great accuracy. The CMM may be disposed with a probe 90 at the probe end 12. CMM arms 2 are well known in the art. A third element of a typical RCA is a transmission means 9, which transmits the movements of the robots links 8 to corresponding links 7 of the CMM arm 2. The configuration of a robot 14, CMM arm 2 and transmission means 9 to form an RCA is well known.

FIG. 11, also depicts an RCA 17 with enhanced manual control. It features such typical RCA components as described above for FIG. 10 and bearing the same reference signs, but the robot 14 is disposed as exoskeleton around an internal CMM Arm 2. The movable member, therefore, is a Robot Exoskeleton 14 that encloses an Internal CMM Arm 2 and manipulates the Internal CMM Arm 2 via transmission means 9 such that it can carry out measurement. The Robot Exoskeleton and the Internal CMM Arm can be rigidly attached at the base 10, 11. The Robot Exoskeleton and the Internal CMM Arm would the same joint axis orientations and joint centres. The configuration of an exoskeleton RCA is well known.

The second embodiment of the invention relates to an RCA 1 such as described above that is operable in a haptic mode. The RCA 1 can be handled by the operator such that it seems almost weightless, with the device able to maintain its position in space when the operator lets go of it. The forces from the operators hand direct the probe end 12 of the RCA 1. The forces are read by sensors which determine the movement direction and optionally speed of the Arm, possibly providing feedback to the operator by way of resistance and/or momentum. The forces from the operator's hands do not apply forces or moments of any size directly on the CMM arm. A Robust RCA 1100, for example, would not receive forces or moments of any size directly onto the Internal CMM Arm 5 that is cradled in the Robot Exoskeleton 6 in an environment in which only minimal forces and torques are applied to the Internal CMM Arm. This means that an RCA having such an enhanced, haptic mode of operation is more accurate than an equivalent Manual CMM Arm because there is no distortion to the RCA structure from manual operation. Furthermore, the haptic mode takes advantage of the natural movements of the operator's hand and grip to achieve precise control which could never be attained by a button interface such as a button pad or joystick.

Manual control of a conventional orthogonal CMM is not widely used for several reasons: (a) the conventional orthogonal CMM usually has a large granite table which gets in the way of the operator accessing areas close to all sides of the object; (b) the conventional orthogonal CMM has large inertias and does not handle naturally. It is an object of this invention that it is natural for an operator to manually operate an RCA and many thousands of Manual CMM Arm operators are used to such natural techniques and can learn how to manually operate an RCA instinctively as if it were a powered tool.

One embodiment of the present invention relates to a Robot co-ordinate measuring machine, CMM, Arm configured to translate and/or rotate a probe end 12, 1000 in a haptic mode.

The RCA 1 having haptic mode of control may be disposed with one or more the features described below.

Sensing Handle

Manual CMM Arms are typically manually operated by gripping with one hand at the wrist of the CMM arm and by gripping with another hand further up the CMM arm towards the elbow. Seven-axis arms are often provided with a handle at the wrist, to aid the operator's control of the arm. The other hand has two functions: firstly, to support the rest of the arm against gravity; if the Manual CMM arm is released by the operator, it falls. The second function is to move the elbow to a preferred position on its arc of possible positions between the shoulder and wrist fixed locations.

One embodiment of the present invention is an RCA 1 as described herein, further comprising a sensing handle 1170 to receive the operator's manual pressure for haptic control. The sensing handle may be a 6 degrees of freedom (DOF) sensing handle. It may be located at the wrist between the robot arm and the probe end. In addition, two opposing buttons at or towards the elbow may also be present. The 6 DOF sensing handle provides complete translation and rotation demands to the RCA control system. The two opposing buttons may signal whether the elbow should move clockwise, anti-clockwise or maintain relative location that is the case when neither of the buttons are pressed. The arrangement of a sensing handle at the wrist and a set of buttons towards the elbow is similar to the arrangement for controlling a manual seven axis CMM arm with both hands; thus the trained operator can make easily the transition from a Manual CMM Arm to the RCA of the present invention without undue effort.

Referring to FIG. 10, an RCA 1 of the invention, may have a Sensing Handle 1170 mounted on the Robot Arm 14 after the final joint 13 or final axis. It is preferably rigidly mounted.

Figure 7:
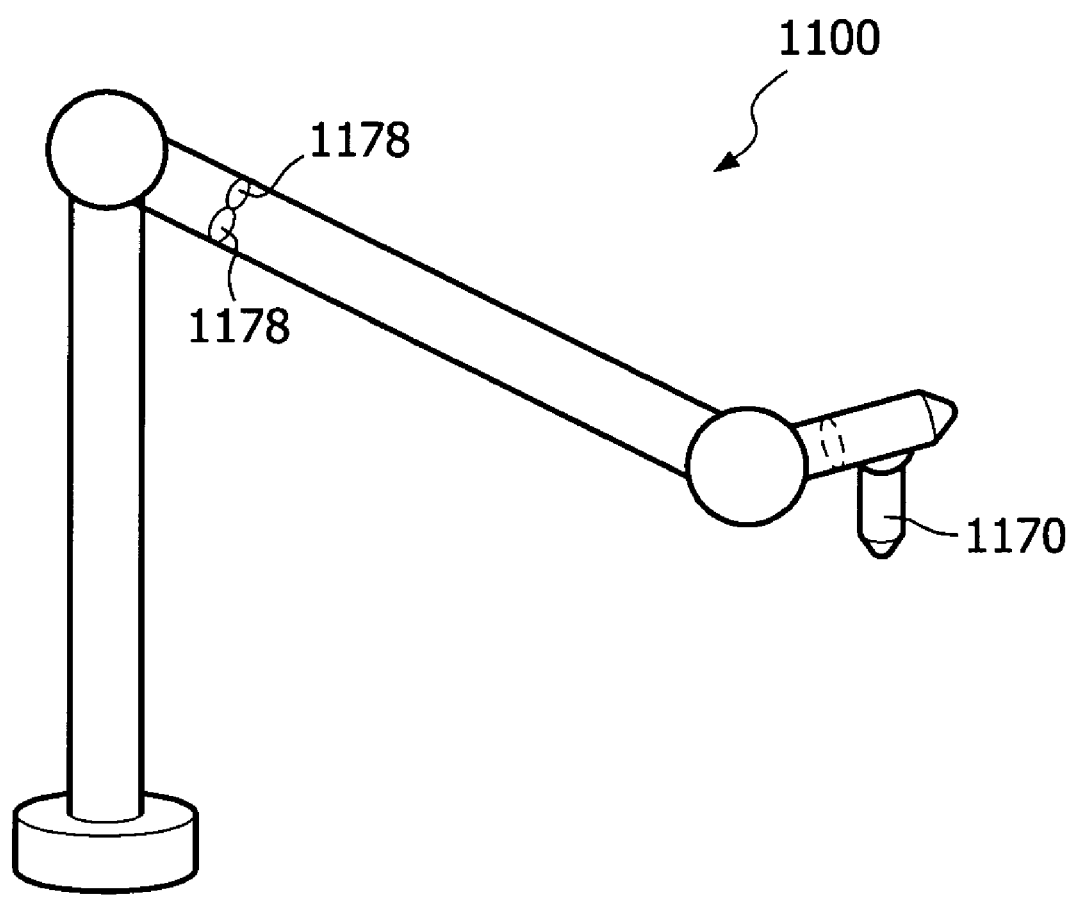
FIG. 7 is a three dimensional representation of a Robust RCA with sensing handle and elbow buttons.

FIG. 7 shows a configuration for a Robust RCA 1100, disposed with a Sensing Handle 1170 rigidly mounted at the wrist after the final axis and two Elbow buttons 1178 mounted on opposite sides of Exoskeleton Segment5 45.

Figure 8:
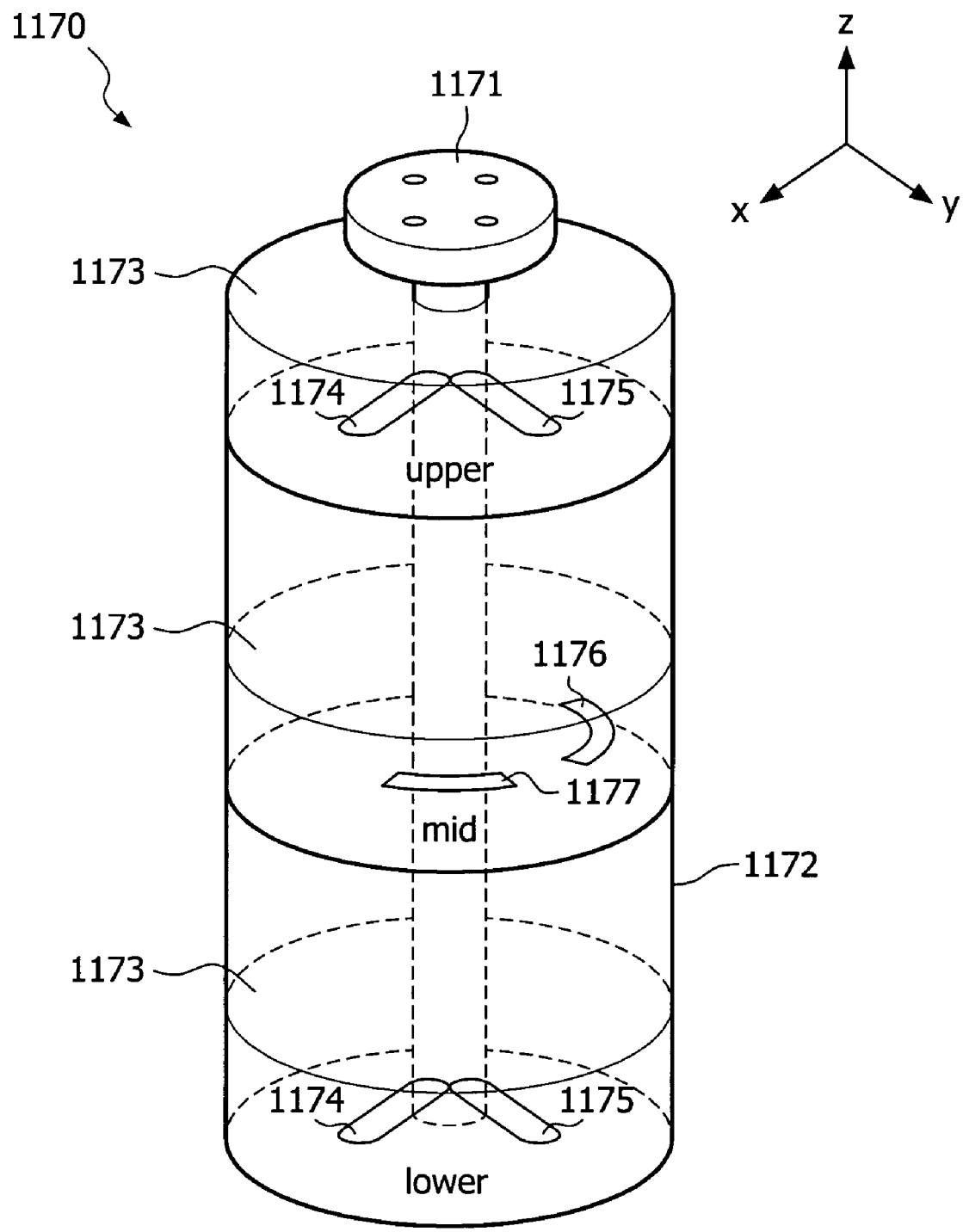
FIG. 8 is a three dimensional representation of a sensing handle.

Referring now to FIG. 8, a Sensing Handle 1170 may comprise a Stem 1171, a Grip 1172 with three Compliant Transfers 1173 between the Stem 1171 and the Grip 1172 such that the Grip 1172 is free to move in 6 DOF in a compliant manner relative to the Stem 1171. An X length sensor 1174 and a Y length sensor 1175 may be embedded in the Upper Compliant transfer 1173 and in the Lower Compliant transfer 1173. A Z shear sensor 1176 and a Twist shear sensor 1177 are embedded in the Mid Compliant transfer 1173. These 6 sensors 1173-1176 may be sufficient to provide 6 DOF guidance information to the Control of the RCA. The sensors 1173-1176 could be strain gauges or any similar sensing component. The X, Y, Z, Yaw, Pitch and Roll components of the operator's applied manual force when holding the Grip 1172 are resolved from the six sensor signals using methods well known to those skilled in the art. The neutral positions of the sensor outputs when the Grip 1172 is not gripped may be calibrated in all orientations with respect to gravity. The strain gauges detect the magnitude of the stress X, Y, Z, Yaw, Pitch and Roll components applied by the operator and higher strain corresponds to faster desired relative movement of the component. In an improved embodiment, the elbow buttons 1178 may detect the magnitude of the operator's manual pressure with higher pressure corresponding to faster desired relative movement of the elbow. In another improved embodiment, buttons 1178 may be located on the Sensing Handle 1170 and the operator can manipulate the RCA with one hand.

RCA Manual Control

Figure 9:
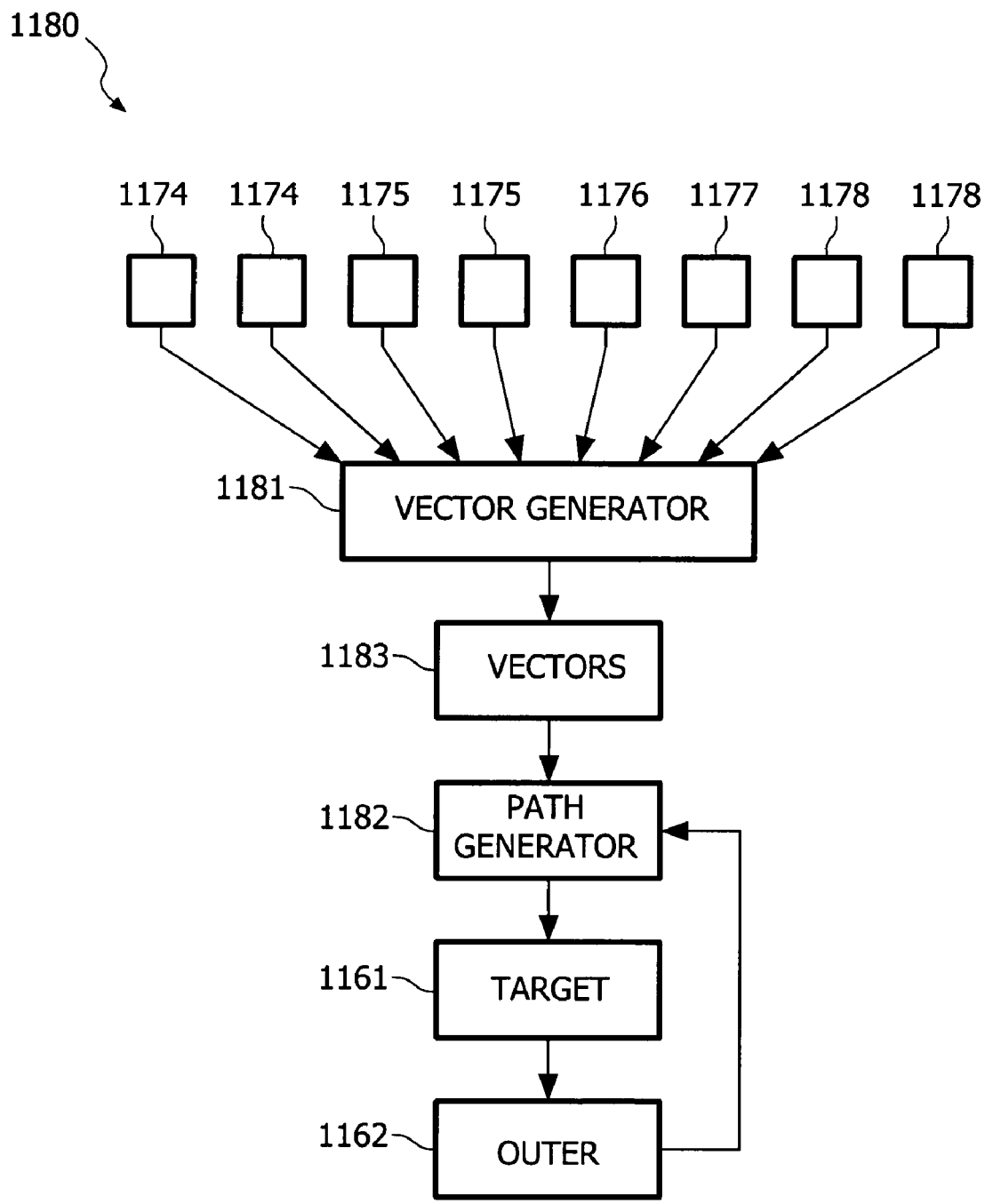
FIG. 9 is a schematic of a manual control architecture for a Robust RCA.

Referring to FIG. 9, an RCA manual (haptic) control system 1180 may comprise input from the eight sensors 1174-1178 into a Vector Generator 1181 that generates the vectors 1183 corresponding to the magnitude and desired direction for movement of the RCA provided by the operator's manual pressures on the sensing handle 1170 and optional elbow buttons 1178. The vectors 1183 generated by the Vector Generator 1181 input into the Path Generator 1182, which also receives the current position and orientation of the Robust CMM Arm 1100 from the Outer Loop 1162. The Path Generator 1182 generates a new Target 1161 for the Outer Loop 1162. The Path Generator 1182 comprises various parameters including:

a) maximum angular velocities at the joints
b) maximum angular accelerations at the joints
c) preset angular decelerations when forces are removed
d) the arm kinematics
e) metrology application During manual operation, the RCA manual control 1180 can incorporate velocity limits to increase safety by reducing the velocities and energies involved. An emergency button or hold to run button on a cable instantly stops the RCA on actuation. Depending on the metrology application, the Path Generator 1182 may generate a path that is linear and/or that has a constant velocity.

Panels and Force Sensors

In an alternative of this second embodiment, much of the outer surface of the RCA 1 is covered by panels mounted to the CMM or Robot Arm via a plurality of analogue force sensors. Where the RCA is a Robust RCA 1100, the panels are mounted to the Exoskeleton 6; the panels have similar shape to the underlying Robot Exoskeleton. Alternatively, the panels can be shaped to meet ergonomic, aesthetic, functional or other needs. The panels are of different sizes and shapes, although it is possible to design the RCA 1 such that two panels are identical and a single tool can be used for their manufacture, thus resulting in cost savings. Each panel is typically attached to the CMM arm, Robot or Robot Exoskeleton 6 by one to four force sensors and a number of stiff mounts. Each sensor senses applied force in one or more directions. The actual movement of the panels with respect to the RCA 1 is small; this gives the RCA 1 a feeling of stiffness to the operator. In total, the panels cover around 80% of the surface area of the RCA. The RCA panels effectively cover much of the movable parts of the RCA except for any probe or tool attached to the probe end 3 of the RCA 1. The panels are light such that robot acceleration or change of orientation of a panel with respect to the gravitational force can be ignored when compared with the relatively large forces from the hands of an operator. The panels cover most of the RCA and any collision will be treated by the haptic control loop as a manual guidance, thus reducing the impact by causing the arm to retract or at least halt.

This embodiment of the RCA 1 can also operate in an automatic mode. The provision of panels covering most of the surface area of the RCA 1 increases the safety of the RCA 1. In the case when the RCA 1 functions normally in automatic operation either following a programmed path or adaptively generating a path, if a human enters the volume of the arm's operation, the human can be struck by the arm. On contacting the human, the force on the RCA panels will increase and the RCA 1 will respond to this by stopping movement in the original direction and moving away to reduce the force on the panel to zero. If the operator is trapped, he can then simply push the RCA 1 away. In the case when the RCA 1 malfunctions and an operator is struck, there are several additional safety modes that can be applied to this invention. Firstly, the arm is light and is covered by soft panels that should reduce the damage caused by the impact. Secondly, the provision of mechanical clutches that can slip physically limits the amount of force that can be applied to the human in the case where he is still trapped. Thirdly, a rapid increase in following error in a motor control system can be detected in the control loop and trigger a halt to the movement of the arms and the default application of brakes to the motors. Fourthly, a rapid increase in the power requirement in a motor control system can be detected in the control loop and trigger a halt to the movement of the arms and the default application of brakes to the motors. Where the RCA is a Robust RCA 1100, the Internal CMM Arm is protected by the Robot Exoskeleton and the panels on collision. The Robot Exoskeleton and skin can also fully or partially protect any delicate probes attached to the Robust RCA 1100. The collision responses in the RCA manual control 1180 and malfunction responses already disclosed provide further protection to the Robust RCA 1100 and Optical probe 91. The Optical probe 91 is protected from collision and consequential damage or loss of accuracy. Most collisions will not require re-calibration of the RCA 1 or its probe (e.g. optical probe 91).

Skin

In an alternative embodiment to this second embodiment, the panels can be replaced by a touch-sensitive skin capable of sensing forces and moments applied by the operator's hands and communicating the forces and moments to the RCA manual control 1180. The skin can cover all or much of the surface area of the RCA 1; the skin can be differentiated from the rest of the surfaces of the RCA 1 by a particular surface texture or colour.

The operator can hold and manipulate the RCA 1 in a similar way to a Manual CMM Arm such as those manufactured by Faro Technologies and Romer. The skin of the RCA 1 may comprise a plurality of force sensors that when acted upon by the operator, provide the intent of human manipulation to the RCA 1 manual (haptic) control 1180. The RCA 1 manual control 1180 then provides a haptic response to that intent by actuating the drive systems to the 7 joints. The haptic behaviour of the RCA 1 to manual touch means that it can be used manually, with a response similar to a Manual CMM arm, but with the advantage of the effort involved being much reduced.

Nudge Bars

In a further embodiment to this second embodiment, a number of nudge bars are provided suitably positioned on the RCA 1 (e.g. on the Robot Exoskeleton of the Robust RCA 1100) for the operator to access with his hands and capable of sensing forces and moments applied by the operator's hands and communicating the forces and moments to the RCA 1 manual (haptic) control 1180. In an alternative embodiment to this second embodiment, a number of joysticks are provided suitably positioned on the RCA 1 for the operator to access with his hands and capable of sensing forces and moments applied by the operator's hands and communicating the forces and moments to the RCA manual control 1180. It is preferable that the sensing devices are placed on the robot exterior (e.g. Robot Exoskeleton of the Robust RCA 1100) to minimise forces and moments applied to the CMM Arm (or Internal CMM Arm of the Robust RCA 1100) during manipulation; however the sensing devices can be placed on any part of the RCA 1.

Contact Probe Collision, Datuming and Measuring

One embodiment of the present invention is an RCA 1 as described herein further comprising a contact probe, configured to decelerate the RCA 1 when contact or force is applied to said probe. The contact probe fitted to the RCA 1, may be a touch trigger probe 92 or other form of probe 90 that signals to the RCA manual control 1180 any contact and/or force applied to its tip is preferable. On receiving a contact signal from a touch trigger probe 92, the RCA manual control 1180 may decelerate the Robust RCA 1100 rapidly to a halt. Further action can be automatic depending on the manual mode of operation selected such as:

(a) retraction of the probe 92 away from the surface;
(b) initiating an automatic probing cycle for measuring the location of a cone feature
(c) initiating an automatic probing cycle for measuring the centre of a sphere
(d) initiating an automatic probing cycle for measuring a plane This contact probe function in the RCA manual control 1180 is useful both in a standard measuring cycle using a touch trigger probe 92 and in the case of collision. The most accurate measurements are made in a controlled way. The probe tip can first impact the object at a high velocity, but a process of retraction followed by gentle approach will lead to an accurate reading.

Point Scanning Probe Measuring

A novel contact scanning 6 degree of freedom mode for the RCA manual control 1180 is hereby disclosed in which a contact force scanning probe 99 once contacting with the surface of an object can map out a path along the surface of the object whilst the RCA is manually guided by the operator. The operator provides a general direction to move to the RCA manual control 1180 by means of manually guiding the arm. The RCA manual control 1180 also receives input from the contact force scanning probe 99. The RCA manual control 1180 generates a path that is in the general direction desired by the operator whilst maintaining near ideal contact and orientation of the contact force scanning probe 99 with the surface of the object, given the physical limitations of the RCA 1. Such a path can be used for mapping out the boundaries of a surface area to be later scanned. Once the boundary has been defined, a scanning program can be automatically generated and executed. Thus, one embodiment of the present invention is an RCA 1 as described herein further comprising a contact probe, configured to automatically perform one or more measurement when contact or force is applied to said probe.

As will be appreciated by those persons skilled in the art, a similar non-contact point scanning 6 degree of freedom control loop is hereby disclosed for use with non-contact point probes such as laser scanning point probes from Wolf & Beck (Germany). This novel 6 degree of freedom control loop is not limited to the apparatus disclosed here and is generally applicable.

Response Parameters

According to one aspect of the invention, the RCA 1 as disclosed herein further comprises a response means to adapt the response of the RCA 1 to the liking of the operator. According to one aspect of the invention the operator can adjust a response parameter that adapts the response of the RCA 1 to his liking. The response parameter is used by the response means to adapt the response of the RCA. Response parameters used by the RCA 1 manual control 1180 may adjust the proportion or application of the response rules. The response parameter is adjusted by means of an RCA user interface. When the response parameter is set to high, the RCA 1 appears to the operator to be very light and responsive to the operator's hands pressing on the panels. When the response parameter is set to low, the RCA 1 appears to the operator to have a high inertia and low accelerations in response to the operator's hands manipulating the panels. It will be appreciated in a 6-7-axis RCA that a number of different response parameters can be provided for the operator to set up the response of the RCA in a number of different ways to suit how he wishes it to respond. For instance the axes at the probe end could be set to have a high response and the axes towards the base end could be set to have a low response. This invention does not limit in any way how response parameters can be specified and implemented within the RCA manual control 1180. It is a further aspect of this embodiment that settings set by an operator for a number of response parameters are saved in a settings file. It is a further aspect of this embodiment that a number of different settings files are provided by the supplier of the RCA for the operator to choose between. The operator can change from one settings file to another. The preferred settings file for an operator can be set and automatically recalled when the operator logs on. One or more of the supplied settings files can be set up specifically for operators used to using a Manual CMM Arm that responds with similarity to that of handling a Manual CMM Arm within the significant constraints imposed by the desire to minimise effort in operation.

Soft-Servoing

In an alternative embodiment of this second embodiment, soft-servoing is provided in which the RCA is configured to move in the direction of a person pushing it.

Third Embodiment

In this third embodiment, a master Robust RCA 1100 is manually manipulated by an operator to remotely tele-operate a slave Robust RCA 1100. This third embodiment is particularly applicable to operations such as measurement in hazardous environments. It is a purpose of this third embodiment that the Robust RCA 1100 invention is operable in a haptic mode such that tele-operation of the slave Robust RCA 1100 by the master Robust RCA 1100 takes place with haptic feedback from the slave Robust RCA 1100 to the master Robust RCA 1100. It is preferable that the master Robust RCA 1100 has a similar axis layout as the slave Robust RCA 1100. It is not necessary for the two Robust RCA 1100 to be identical in dimension or any other capability. It is a further object of this third embodiment, that any suitable tele-manipulating device can be used as a master device to remotely operate a slave Robust RCA 1100; for instance, a manual CMM arm can be used as the master device; a robot with force sensors to sense the operator's intent and respond to it can be used as the master device.

The invention claimed is:

1. An articulated measurement apparatus comprising: Robot Co-ordinate Measuring Machine Arm, RCA, having a Robot, Coordinate Measuring Machine, CMM, Arm, transmission means and measurement probe for measuring an object, configured so that movements of the robot are transmitted to the CMM Arm via the transmission means, further comprising sensors that receive an operator's manual pressure configured to translate and/or rotate a probe end in a haptic mode.

2. The articulated measurement apparatus according to claim 1, wherein the sensors are pressure sensors and are comprised in a sensing handle.

3. The articulated measurement apparatus according to claim 2, wherein said sensing handle is mounted on the Robot Arm after the final joint.

4. The articulated measurement apparatus according to claim 2, wherein the sensing handle comprises a stem, a grip with three compliant transfers between the stem and grip such that the grip is free to move in six degrees of freedom in a compliant manner relative to the stem.

5. The articulated measurement apparatus according to claim 4, wherein an X length sensor and a Y length sensor are embedded in the Upper Compliant transfer and in a Lower Compliant transfer and a Z shear sensor and a Twist shear sensor are embedded in a Mid Compliant transfer.

6. The articulated measurement apparatus according to claim 1, further comprising two opposing buttons at or towards the elbow, configured to rotate an elbow of the arm in a clockwise or anti-clockwise direction.

7. The articulated measurement apparatus according to claim 1, wherein said measurement probe is a contact probe, configured to decelerate the RCA when contact or force is applied to said probe.

8. The articulated measurement apparatus according to claim 1, wherein said measurement probe is a contact probe, configured to automatically perform one or more measurements when contact or force is applied to said probe.

9. The articulated measurement apparatus according to claim 1, wherein said measurement probe is a contact force scanning probe, which RCA is configured to maintain near ideal contact and orientation between said scanning probe and the object being scanned, while the operator provides a general direction to move the RCA by manually guiding the arm.

10. The articulated measurement apparatus according to claim 9, wherein said response adapter adapts the response of the RCA to appear light and responsive to the operator's hands manipulating the Arm.

11. The articulated measurement apparatus according to claim 9, wherein said response adapter adapts the response of the RCA to appear to have high inertia and low accelerations to the operator's hands manipulating the Arm.

12. The articulated measurement apparatus according to claim 1, comprising a response adapter that adapts the response of the RCA to the liking of the operator.

13. The articulated measurement apparatus in accordance with claim 1, having a tele-operation to a second apparatus which is a manual or non-manual RCA.

14. The articulated measurement apparatus according to claim 1, wherein said RCA comprises a robot exoskeleton.

15. The articulated measurement apparatus according to claim 1 wherein the sensors are force sensors and are comprised in panels that cover most of the outer surface of the RCA.

16. The articulated measurement apparatus according to claim 1 wherein the sensors are force sensors comprised in a plurality of nudge bars positioned on the RCA.

* * * * *